(12) United States Patent
Minato

(10) Patent No.: US 7,660,536 B2
(45) Date of Patent: Feb. 9, 2010

(54) OPTICAL MODULATING CIRCUIT AND OPTICAL MODULATING METHOD

(75) Inventor: Naoki Minato, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 498 days.

(21) Appl. No.: 11/636,653

(22) Filed: Dec. 11, 2006

(65) Prior Publication Data

US 2007/0134004 A1   Jun. 14, 2007

(30) Foreign Application Priority Data

Dec. 14, 2005   (JP) ............................. 2005-360095

(51) Int. Cl.
*H04B 10/12*   (2006.01)
(52) U.S. Cl. ........................ 398/188; 398/183; 398/182; 398/87; 398/84; 398/102; 398/82; 398/77
(58) Field of Classification Search ................. 398/188, 398/183, 182, 87, 84, 102, 82, 77
See application file for complete search history.

(56) References Cited

U.S. PATENT DOCUMENTS 5,020,872 A * 6/1991 DuPuy et al. ................. 385/16

(Continued)

OTHER PUBLICATIONS

Yuichi Tanaka, Optical Multi-Wavelength PPM for high data rate transmission on indoor channels, 1997, IEEE, Department of Electrical Engineering, Faculty of Science and Technology, Keio University 3-14-1 Hiyoshi, Kohoku-ku, Yokohoma-shi, Kanagawa 223 Japan, pp. 979-983.*

(Continued)

*Primary Examiner*—Ken N Vanderpuye
*Assistant Examiner*—Amine Benlagsir
(74) *Attorney, Agent, or Firm*—Venable LLP; James R. Burdett; Kyle D. Petaja

(57) ABSTRACT

An optical modulating circuit realizing a PPM is constituted by circuit parts having a frequency band equal to a data rate to provide a technique which increase the data rate. A first light source generates a first single wavelength signal serving as a continuous light having a first wavelength $\lambda1$ as a wavelength of a carrier wave. A second light source generates a second single wavelength signal serving as a continuous light having a second wavelength $\lambda2$ different from $\lambda1$ as a wavelength of a carrier wave. For the first single wavelength signal and the second single wavelength signal, according to a transmission electric signal having information 0 or 1, an optical switch outputs a first single wavelength signal as an input optical signal when the information is 0. On the other hand, when the information is 1, the optical switch outputs the second single wavelength signal as an input optical signal. An optical modulator generates an optical pulse signal obtained by arranging optical pulses having $\lambda1$ or $\lambda2$ as a wavelength of a carrier wave at predetermined time intervals from the input optical signal. A delaying unit delays the optical pulse having the wavelength $\lambda1$ and the optical pulse having the wavelength $\lambda2$ by different delay time $\Delta t$ to obtain a PPM signal.

20 Claims, 14 Drawing Sheets

U.S. PATENT DOCUMENTS

| | | | | |
|---|---|---|---|---|
| 5,522,004 | A | * | 5/1996 | Djupsjobacka et al. ...... 398/147 |
| 5,726,789 | A | * | 3/1998 | Horiuchi et al. ............. 398/191 |
| 5,805,328 | A | * | 9/1998 | Satoh et al. ................. 359/245 |
| 5,926,297 | A | * | 7/1999 | Ishikawa et al. .............. 398/43 |
| 5,995,255 | A | * | 11/1999 | Giles ........................... 398/34 |
| 7,224,902 | B2 | * | 5/2007 | Nishiki ........................ 398/87 |
| 2002/0012500 | A1 | * | 1/2002 | Paek ........................... 385/37 |
| 2003/0086647 | A1 | * | 5/2003 | Willner et al. ................ 385/37 |
| 2004/0175188 | A1 | * | 9/2004 | Bellemare et al. ........... 398/186 |

OTHER PUBLICATIONS

S. Kutsuzawa et al., "10Gb/s× 2ch Signal Unrepeated Transmission Over 100 km of Data Rate Enhanced Time-Spread/Wavelength-Hopping OCDM Using 2.5-Gb/s-FBG En/Decoder", IEEE Photonics Technology Letters, vol. 15, No. 2, Feb. 2002, pp. 317-319.

M.L. Stevens et al., "A Novel Variable-Rate Pulse-Position Modulation System with Near Quantum Limited Performance", Lasers and Electro-Optics Society 1999 12th Annual Meeting, vol. 1, pp. 301-302, 1999.

* cited by examiner

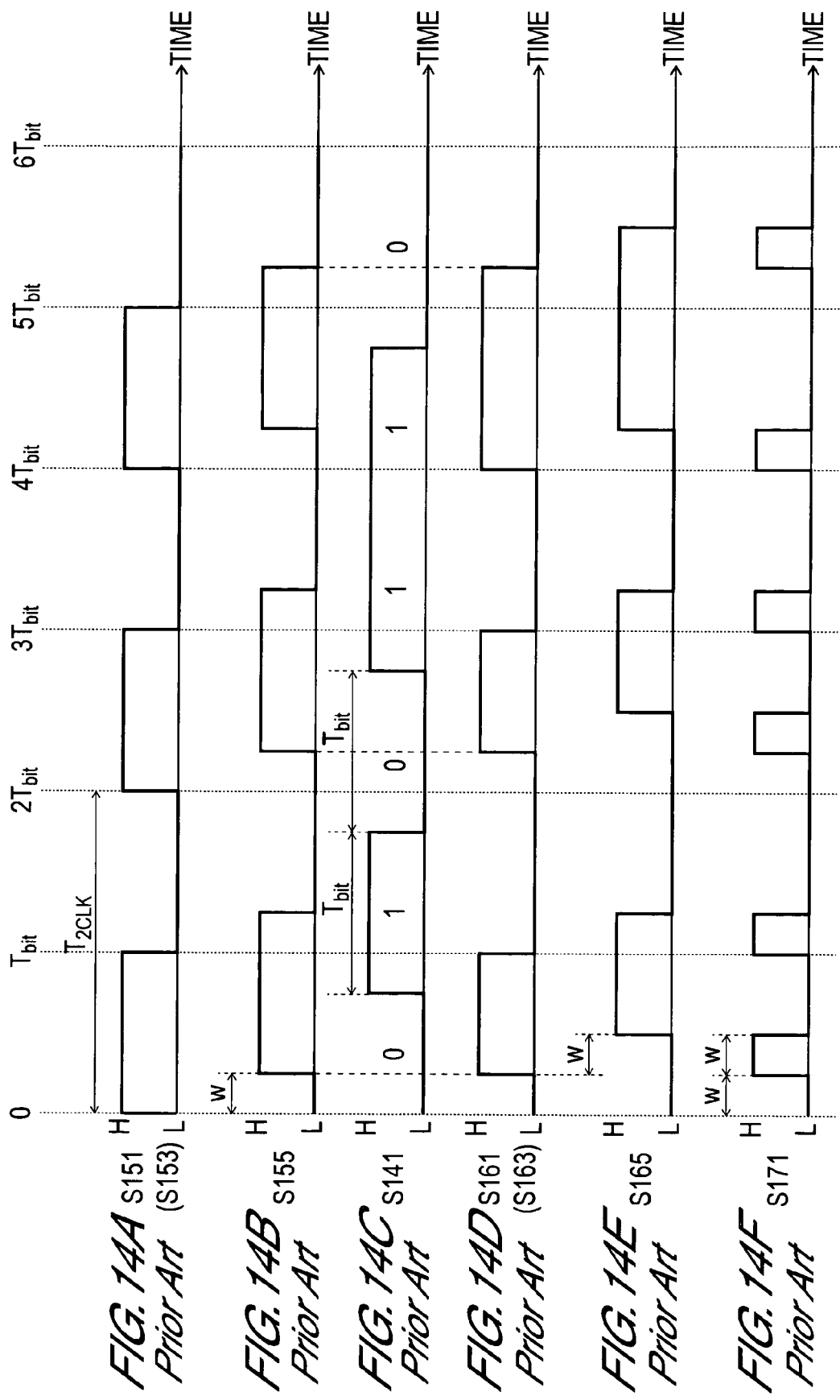

OPTICAL MODULATING CIRCUIT AND OPTICAL MODULATING METHOD

BACKGROUND OF THE INVENTION

1. Field of the Invention

The present invention relates to an optical modulating circuit and an optical modulating method which perform pulse position modulation.

2. Description of Related Art

Pulse Position Modulation (PPM) is a modulating method by which pulse signals are assigned to pieces of digital information "0" and "1", and modulation of the pulse signals is performed by changing pulse positions from a reference position on a time axis regulated by a clock signal having a constant frequency corresponding.

A conventional modulating circuit and method using PPM will be described below with reference to FIG. 13 and FIGS. 14A, 14B, 14C, 14D, 14E, and 14F (for example, see document 1: M. L. Stevens et al., "A Novel Variable—Rate Pulse—Position Modulation System with Near Quantum Limited Performance", Lasers and Electro-Optics Society 1999 12$^{th}$ Annual Meeting., Vol. 1, pp. 301-302, 1999). FIG. 13 is a block diagram of a conventional modulating circuit. FIGS. 14A, 14B, 14C, 14D, 14E, and 14F are time charts for explaining an operational principle of the conventional modulating circuit shown in FIG. 13. In FIGS. 14A, 14B, 14C, 14D, 14E, and 14F, time is plotted along the horizontal axes, and voltages of signals are plotted along the vertical axes. In FIGS. 14A, 14B, 14C, 14D, 14E, and 14F, reference positions on the time axis are represented by 0, $T_{bit}$, $2T_{bit}$, $3T_{bit}$, $4T_{bit}$, $5T_{bit}$, and $6T_{bit}$, respectively, at time intervals equal to a data cycle $T_{bit}$.

The modulating circuit includes a multiplexer 93, a first phase shifter 91, a second phase shifter 95, and an exclusive OR gate 97.

A clock signal (indicated by an arrow S151 in FIG. 13) generated inside or outside the modulating circuit and having a cycle $T_{2CLK}$ (=2×$T_{bit}$) twice the data cycle $T_{bit}$, i.e., a frequency ½ data rate is divided into two signals, i.e., a first clock signal (indicated by an arrow S153 in FIG. 13) and a second clock signal (indicated by an arrow S155 in FIG. 13). The first clock signal S153 is transmitted to the multiplexer 93 (FIG. 14A). On the other hand, the second clock signal S155 is delayed by time w by means of the first phase shifter 91 and then transmitted to the multiplexer 93 (FIG. 14B).

The multiplexer 93 has a 3-input-1-output configuration. Of first to third input ports held by the multiplexer 93, the first input port and the second input port receives the first clock signal S153 and the second clock signal S155, respectively. A transmission electric signal (indicated by an arrow S141 in FIG. 13) is input to the third input port. The transmission electric signal S141 is a signal of an NRZ (Non-Return to Zero) format having a cycle of $T_{bit}$, i.e., an NRZ signal. The transmission electric signal S141 is set at a Low (L) level and a High (H) level in accordance with pieces of digital information "0" and "1", respectively (FIG. 14C). When the state of the transmission electric signal S141 is at H level, the multiplexer 93 outputs a signal input from the first input port, i.e., the first clock signal S153 as a multiplexed signal (indicated by an arrow S161 in FIG. 13). On the other hand, when the state of the transmission electric signal S141 is at L level, the multiplexer 93 outputs the signal input from the second input port, i.e., the second clock signal S155 as a multiplexed signal S161 (FIG. 14D).

The multiplexed signal S161 is divided or branched into two signals, i.e., a first multiplexed signal (indicated by an arrow S163 in FIG. 13) and a second multiplexed signal (indicated by an arrow S165 in FIG. 13). The first multiplexed signal S163 is transmitted to the exclusive OR gate 97. On the other hand, the second multiplexed signal S165 delayed by time w by means of the second phase shifter 95 and then transmitted to the exclusive OR gate 97 (FIG. 14E).

The exclusive OR gate 97 outputs a signal at L level when both the first multiplexed signal S163 and the second multiplexed signal S165 are at H level or L level. The exclusive OR gate 97 outputs a signal at H level when one of the first multiplexed signal S163 and the second multiplexed signal S165 is at H level and the other is at L level. As a result, a PPM signal (indicated by an arrow S171 in FIG. 13) is obtained as an electric signal (FIG. 14F). In the PPM signal S171, a pulse corresponding to the digital information "1" rises at a reference position on the time axis, and a pulse corresponding to the digital information "0" rises at a position delayed by the time w from the reference position on the time axis.

The modulating circuit disclosed in document 1 converts the PPM signal S171 obtained as the electric signal into an optical signal and then transmits the optical signal.

In this case, as shown in FIG. 14F, in the PPM signal, a rising edge and a falling edge of a pulse are generated once each within time corresponding to one data cycle $T_{bit}$. For this reason, as a frequency band of circuit parts constituting a modulating circuit, a frequency twice or more a data rate is necessary. As a result, the data rate is limited to the frequency band of the circuit parts. When data of two or more bits is transmitted in one data cycle, the circuit parts require further high speed of response.

In order to solve the problem, when the present inventor according to this application concentratedly studied, the following fact was found. That is, an optical pulse signal in which optical pulses having different wavelengths of carrier waves are arranged at constant time intervals corresponding to transmission signal is generated, and the optical pulses having the different wavelengths of the carrier waves are delayed by different delay times, so that PPM can be realized by a modulating circuit having circuit parts having a frequency band equal to a data rate.

The invention has been made in consideration of the above problems, and accordingly, objects of the present invention are to provide an optical modulating circuit which is constituted by circuit parts having a frequency band equal to a data rate to increase the data rate in communication using PPM and realizes PPM, and an optical modulating method using the optical modulating circuit, respectively.

SUMMARY OF THE INVENTION

According to a first aspect of the present invention, there is provided an optical modulating circuit which includes a first light source, a second light source, an optical switch, an optical modulator, and a delaying unit. The first light source generates as a first single wavelength signal a continuous light having a wavelength of a carrier wave as a first wavelength. The second light source generates as a second single wavelength signal a continuous light having a wavelength of the carrier wave as a second wavelength different from the first wavelength.

The first single wavelength signal and the second single wavelength signal are input to the optical switch as a first switch input signal and a second switch input signal, respectively. To the optical switch, a transmission electric signal having information "0" or "1" is input as a switching signal. When the information held by the switching signal is "0", the optical switch selects the first single wavelength signal as a switch output signal. On the other hand, when the information held by the switching signal is "1", the optical switch selects the second single wavelength signal as a switch output signal. The optical switch outputs the selected switch output signal as an input optical signal.

An optical modulator generates, from the input optical signal, an optical pulse signal obtained by arranging optical pulses each having any one of the first wavelength and the second wavelength as a wavelength of a carrier wave at constant time intervals. The delaying unit delays the optical pulse having the first wavelength as the wavelength of the carrier wave and an optical pulse having second wavelength as a wavelength of the carrier wave by different delay times to obtain a pulse position modulating signal.

According to the optical modulating circuit, in accordance with information held by a transmission electric signal, wavelengths of a carrier wave are two wavelengths different from each other. After optical pulses arranged at constant time intervals, the optical pulses are delayed by delay times changed depending on the wavelengths. As a result, pulse position modulation can be realized by using an electric circuit of a frequency band equal to a data rate.

In execution of the optical modulating circuit, the delaying unit preferably includes an optical circulator and a fiber bragg grating delayer. The fiber bragg grating delayer is constituted such that a first unit fiber bragg grating and a second unit fiber bragg grating are sequentially arranged in an optical fiber in a propagating direction of light in the optical fiber, and generates a pulse position modulating signal from an optical pulse signal. The first unit fiber bragg grating reflects an optical pulse having the first wavelength as a wavelength of a carrier wave. The second unit fiber bragg grating reflects an optical pulse having the second wavelength as a wavelength of a carrier wave. The optical circulator transmits the optical pulse signal to the fiber bragg grating delayer and outputs the pulse position modulating signal obtained by the fiber bragg grating delayer.

When the fiber bragg grating delayer is used as a delayer, two unit fiber bragg gratings which reflect optical pulses having wavelength different from each other in one optical fiber, and an optical modulating circuit can be realized by a simple circuit configuration.

According to a second aspect of the invention, there is provided an optical modulating circuit constituted by first to $2^n$-th (n is an integer of 2 or more) light sources, an optical switch unit, an optical modulator, and a delaying unit.

The first to $2^n$-th light sources generate first to $2^n$-th single wavelength signals serving as continuous lights having first to $2^n$-th wavelengths different from each other as wavelengths of carrier waves, respectively.

The optical switch unit selects any one of the first to $2^n$-th single wavelength signals as an input optical signal in correspondence to pieces of n-bit information expressed by first to n-th transmission electric signals each having the information "0" or "1" input as a switching signal, respectively, and outputs the selected input optical signal. The optical modulator generates an optical pulse signal obtained by arranging optical pulses having the first to $2^n$-th wavelengths as wavelengths of carrier waves at constant time intervals. The delaying unit delays the optical pulses having the first to $2^n$-th wavelengths as the wavelengths of the carrier waves by different delay times, respectively, to obtain a pulse position modulating signal.

According to the above-mentioned optical modulating circuit, in accordance with information held by the transmission electric signal, optical pulses having $2^n$ different wavelengths as wavelengths of carrier waves and arranged at constant time intervals are generated, and the optical pulses are delayed by delay times changed depending on the wavelengths. As a result, with respect to information of 2 or more bits, by using an electric circuit having a frequency band equal to a data rate, pulse position modulation can be realized.

In execution of the optical modulating circuit, the delaying unit preferably includes an optical circulator and a fiber bragg grating delayer. The fiber bragg grating delayer is constituted such that first to $2^n$-th unit fiber bragg gratings are sequentially arranged in an optical fiber in a propagating direction of light in the optical fiber and generates a pulse position modulating signal from the optical pulse signal. The first to $2^n$-th unit fiber bragg gratings reflect optical pulses having first to $2^n$th wavelengths as wavelengths of carrier waves. The optical circulator transmits an optical signal to the fiber bragg grating delayer and outputs the pulse position modulating signal obtained by the fiber bragg grating delayer.

When the fiber bragg grating delayer is used as a delayer, $2^n$ unit fiber bragg gratings which reflect optical pulses having $2^n$ different wavelengths may be formed in only one optical fiber. Even in a multi-valued state, an optical modulating circuit can be realized by a simple circuit configuration.

In execution of the optical modulating circuit, when n is 2, the optical switch unit preferably includes a first-step switch (to be referred to a 1-step switch) including first and second sub-switches and a second-step switch (to be referred to as a 2-step switch).

First and second single wavelength signals are input to the first sub-switch as first and second switch input signals, and a first transmission electric signal is input to the first sub-switch as a switching signal. When information held by the first transmission electric signal is "0", the first sub-switch selects the first single wavelength signal as a switch output signal. On the other hand, when information held by the first transmission electric signal is "1", the first sub-switch selects the second single wavelength signal as a switch output signal. The first sub-switch outputs the selected switch output signal to the 2-step switch as a first sub-switch signal.

Third and fourth single wavelength signals are input to the second sub-switch as the first and second switch input signals, and the first transmission electric signal is input to the second sub-switch as a switching signal. When the information held by the first transmission electric signal is "0", the second sub-switch selects the third single wavelength signal as a switch output signal. On the other hand, when the information held by the first transmission electric signal is "1", the second sub-switch selects the fourth single wavelength signal as a switch output signal. The second sub-switch outputs the selected switch output signal to the 2-step switch as a second sub-switch signal.

The first and second sub-switch signals are input to the 2-step switch as the first and second switch input signals, and the second transmission electric signal is input to the 2-step switch as a switching signal. When information held by the second transmission electric signal is "0", the 2-step switch selects the first sub-switch signal as a switch output signal. On the other hand, when the information held by the second transmission electric signal is "1", the 2-step switch selects the second sub-switch signal as a switch output signal. The 2-step switch outputs the selected switch output signal as an input optical signal.

In execution of the optical modulating circuit described above, when n is 3 or more, the optical switch unit preferably includes a 1-step switch including first to $(2^{n-1})$-th sub-switches, a k-th switch (to be referred to as a k-step switch)

including first to $2^{n-k}$ (k is an integer which is 2 or more and n−1 or less), and an n-th switch (to be referred to as an n-step switch).

To an m-th (m is an integer which is 1 or more and $2^{n-1}$ or less) including the 1-step switch, a (2m−1)-th single wavelength signal and a 2m-th single wavelength signal are input as first and second switch input signals, respectively, and the first transmission electric signal as a switching signal. When the information held by the first transmission electric signal is "0", an m-th sub-switch selects the (2m−1)-th single wavelength signal as a switch output signal. On the other hand, when the information held by the first transmission electric signal is "1", the m-th sub-switch selects the 2m-th single wavelength signal as a switch output signal. The m-th sub-switch outputs the selected switch output signal as an m-th sub-switch signal included in a 1-step signal.

To a p-th (p is an integer which is 1 or more and $2^{n-k}$ or less) included in the k-step switch, a (2p−1)-th and a 2p-th sub-switch signals included in a (k−1)-step signal are input as first and second switch input signals, respectively, and a k-th transmission electric signal is input as a switching signal. When the information held by the k-th transmission electric signal is "0", the p-th sub-switch selects a (2p−1)-th sub-switch signal as a switch output signal. On the other hand, when the information held by the k-th transmission electric signal is "1", the p-th sub-switch selects the 2p-th sub-switch signal as a switch output signal. The p-th sub-switch outputs the selected switch output signal as a p-th sub-switch signal included in a k-step signal.

To an n-step switch, first and second sub-switch signals included in an (n−1)-step signal are input as first and second switch input signals, and an n-th transmission electric signal is input as a switching signal. When information held by the n-th transmission electric signal is "0", an n-step sub-switch selects the first sub-switch signal as a switch output signal. On the other hand, when the information held by the n-th transmission electric signal is "1", the n-step switch selects the second sub-switch signal as a switch output signal and outputs the selected switch output signal as an input optical signal.

In execution of the optical modulating circuit described above, each of the optical switch and the sub-switches included in the optical switch unit preferably includes a first Electro-absorption modulator to which a first switch input signal is input, a second Electro-absorption modulator to which a second switch input signal is input, an optical coupler, and an inverting circuit.

To the first Electro-absorption modulator, the first switching signal which is one of signals obtained by dividing the switching signals is input. When information held by the switching signal is "0", the first Electro-absorption modulator outputs a first switch input signal. On the other hand, when the information held by the switching signal is "1", the first Electro-absorption modulator does not output the first switch input signal.

To the second Electro-absorption modulator, the second switching signal which is the other of the signals obtained by dividing the switching signal is inverted by the inverting circuit and then input. When the information held by the switching signal is "0", the second Electro-absorption modulator does not outputs a second switch input signal. On the other hand, when a state of the switching signal is "1", the second Electro-absorption modulator outputs the second switch input signal.

The optical coupler couples outputs from the first Electro-absorption modulator and the second Electro-absorption modulator to output a resultant signal as a switch output signal.

In execution of the optical modulating circuit, each of the optical switch and the sub-switches included in the optical switch unit preferably includes a first optical coupler, a second optical coupler, and an optical phase modulator.

The first optical coupler divides each of the first switch input signal and the second switch input signal into a first branch signal and a second branch signal. The first optical coupler transmits the first branch signal to the second optical coupler through the optical phase modulator and transmits the second branch signal to the second optical coupler. The second optical coupler couples the first branch signal and the second branch signal to output a resultant signal as a switch output signal.

The optical phase modulator changes phases of the first branch signal according to the switching signal. When the information held by the switching signal is "0", the optical phase modulator sets a phase difference between the first switch input signals on two paths at 0 and sets a phase difference between the second switch input signals on two paths at π. At this time, the first switch input signal is output as a switch output signal. On the other hand, when the information held by the switching signal is "1", the optical phase modulator sets the phase difference between the first switch input signals on the two paths at π and sets the phase difference between the second switch input signals on the two paths at 0. At this time, the second switch input signal is output as a switch output signal.

As described above, as the optical switch used to obtain an input optical signal from two or more continuous lights having different wavelengths, there are an optical switch using two Electro-absorption modulators and an optical switch using an interferometer constituted by two optical coupler and one optical phase modulator. When the two Electro-absorption modulators are used, two electric signals are required to operate the Electro-absorption modulators. However, since optical interference is not utilized, random polarized light may be used as a single wavelength signal. On the other hand, when the interferometer is used, a coherency of a single wavelength signal must be made high because optical interference is utilized. However, only one electric signal may be used to operate the optical phase modulator.

According to a third aspect of the invention, an optical modulating method includes following processes. For a first single wavelength signal serving as a continuous light having a first wavelength as a wavelength of a carrier wave and a second single wavelength signal serving as a continuous light having a second wavelength different from the first wavelength as a wavelength of a carrier wave, according to a transmission electric signal having two pieces of information "0" and "1", when the information is "1", the first single wavelength signal is selected as an input optical signal, and, on the other hand, when the information is "0", the second single wavelength signal is selected as an input optical signal. From the selected input optical signal, an optical pulse signal obtained by arranging optical pulses each having the first wavelength or the second wavelength as a wavelength of a carrier wave at constant time intervals is generated. With respect to the optical pulse signal, the optical pulse having the first wavelength as the wavelength of the carrier wave and the optical pulse having the second wavelength as the wavelength of the carrier wave are delayed by different delay times to obtain a pulse position modulating signal.

According to a fourth aspect of the invention, there is provided an optical modulating method including the following processes. For first to $2^n$-th single wavelength signals serving as continuous lights having first to $2^n$-th (n is an integer which is 2 or more) having wavelengths of carrier waves different from each other, first to $2^n$-th single wavelength signals are selected as input optical signals in correspondence to pieces of n-bit information expressed by first to nth transmission electric signals representing information 0 or 1, respectively. From the selected input optical signals, an optical pulse signal obtained by arranging optical pulses each having any one of the first to $2^n$-th wavelengths as a wavelength of a carrier wave at constant time intervals is generated. The optical pulses having the first to $2^n$-th wavelengths as the wavelengths of the carrier waves are delayed by different delay times to obtain a pulse position modulating signal.

BRIEF DESCRIPTION OF THE DRAWINGS

The foregoing and other objects, features and advantageous of the present invention will be better understood from the following description taken in connection with the accompanying drawings, in which;

FIG. 2A is a time chart showing a first single wavelength signal. FIG. 2B is a time chart showing a second single wavelength signal. FIG. 2C is a time chart showing a transmission electric signal. FIG. 2D is a time chart showing an input optical signal. FIG. 2E is a time chart showing a clock signal. FIG. 2F is a time chart showing an optical pulse signal. FIG. 2G is a time chart showing a PPM signal;

FIG. 7A is a time chart showing a first single wavelength signal. FIG. 7B is a time chart showing a second single wavelength signal. FIG. 7C is a time chart showing a third single wavelength signal. FIG. 7D is a time chart showing a fourth single wavelength signal. FIG. 7E is a time chart showing a first transmission electric signal. FIG. 7F is a time chart showing a second transmission electric signal. FIG. 7G is a time chart showing an input optical signal. FIG. 7H is a time chart showing an optical pulse signal. FIG. 7I is a time chart showing a PPM signal;

FIGS. 14A, 14B, 14C, 14D, 14E and 14F are time charts for explaining an operational principle of a conventional modulating circuit. FIG. 14A is a time chart showing a first clock signal. FIG. 14B is a time chart showing a second clock signal. FIG. 14C is a time chart showing a transmission electric signal. FIG. 14D is a time chart showing a first multiple signal. FIG. 14E is a time chart showing a second multiple signal. FIG. 14F is a time chart showing a PPM signal.

DESCRIPTION OF THE PREFERRED EMBODIMENTS

Embodiments of the present invention will be described below with reference to the accompanying drawings. However, the embodiments are only preferred examples. Therefore, the invention is not limited to the following embodiments.

First Embodiment

An optical modulating circuit and an optical modulating method according to the first embodiment will be described with reference to FIG. 1 and FIGS. 2A, 2B, 2C, 2D, 2E, 2F, and 2G. In FIGS. 2A, 2B, 2C, 2D, 2E, 2F, and 2G, time is plotted along the horizontal axes, and voltages of electric signals and light intensities of optical signals are plotted as magnitudes of signals along the vertical axes. In FIGS. 2A, 2B, 2C, 2D, 2E, 2F, and 2G, reference positions on time axes are represented by 0, $T_{bit}$, $2T_{bit}$, $3T_{bit}$, $4T_{bit}$, $5T_{bit}$, and $6T_{bit}$ at time intervals equal to a data cycle $T_{bit}$.

The optical modulating circuit 10 includes a first light source 15-1, a second light source 15-2, an optical switch 30, an optical modulator 50, and a delaying unit 60.

Figure 1:
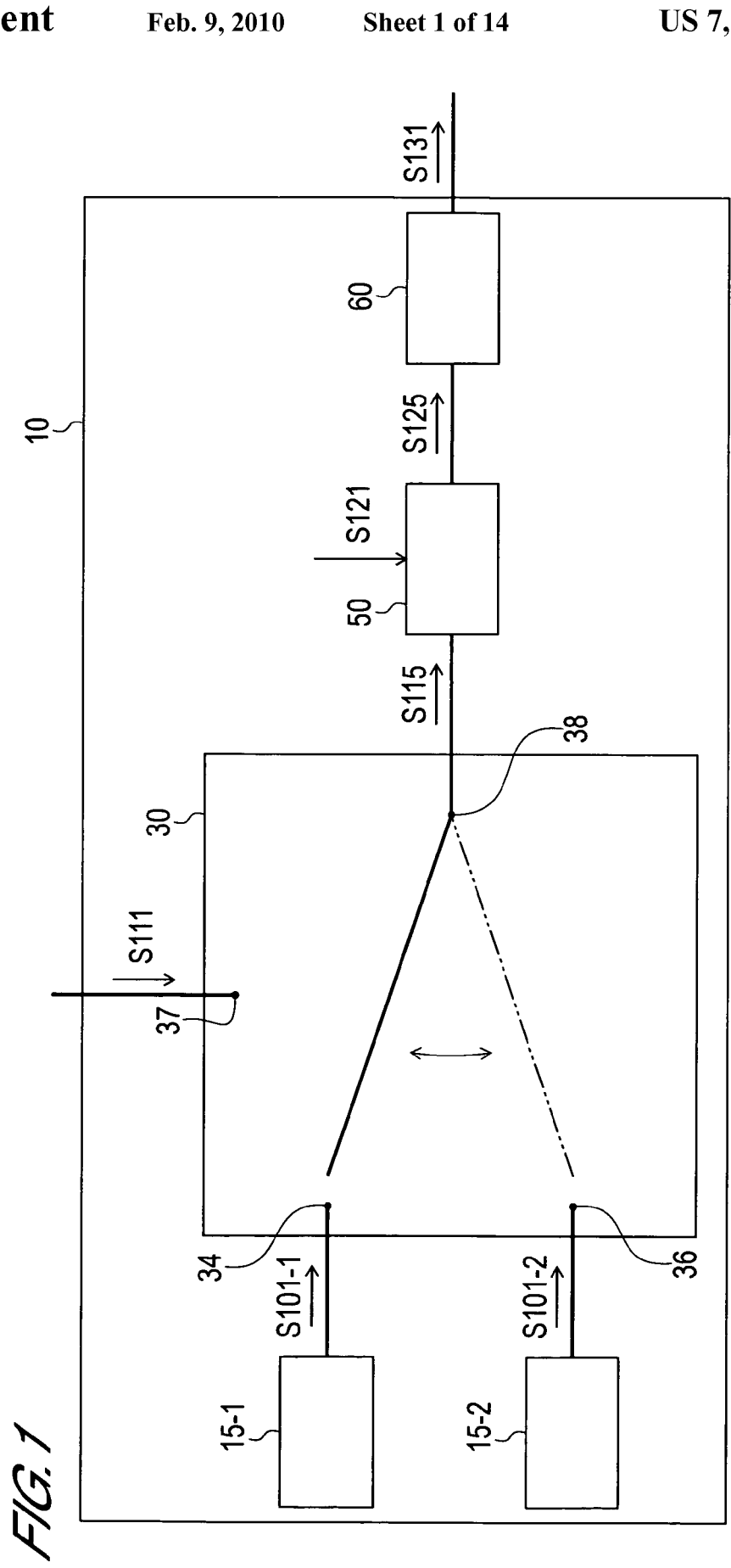
FIG. 1 is a block diagram showing one configuration of an optical modulating circuit according to a first embodiment.
Figure 2:
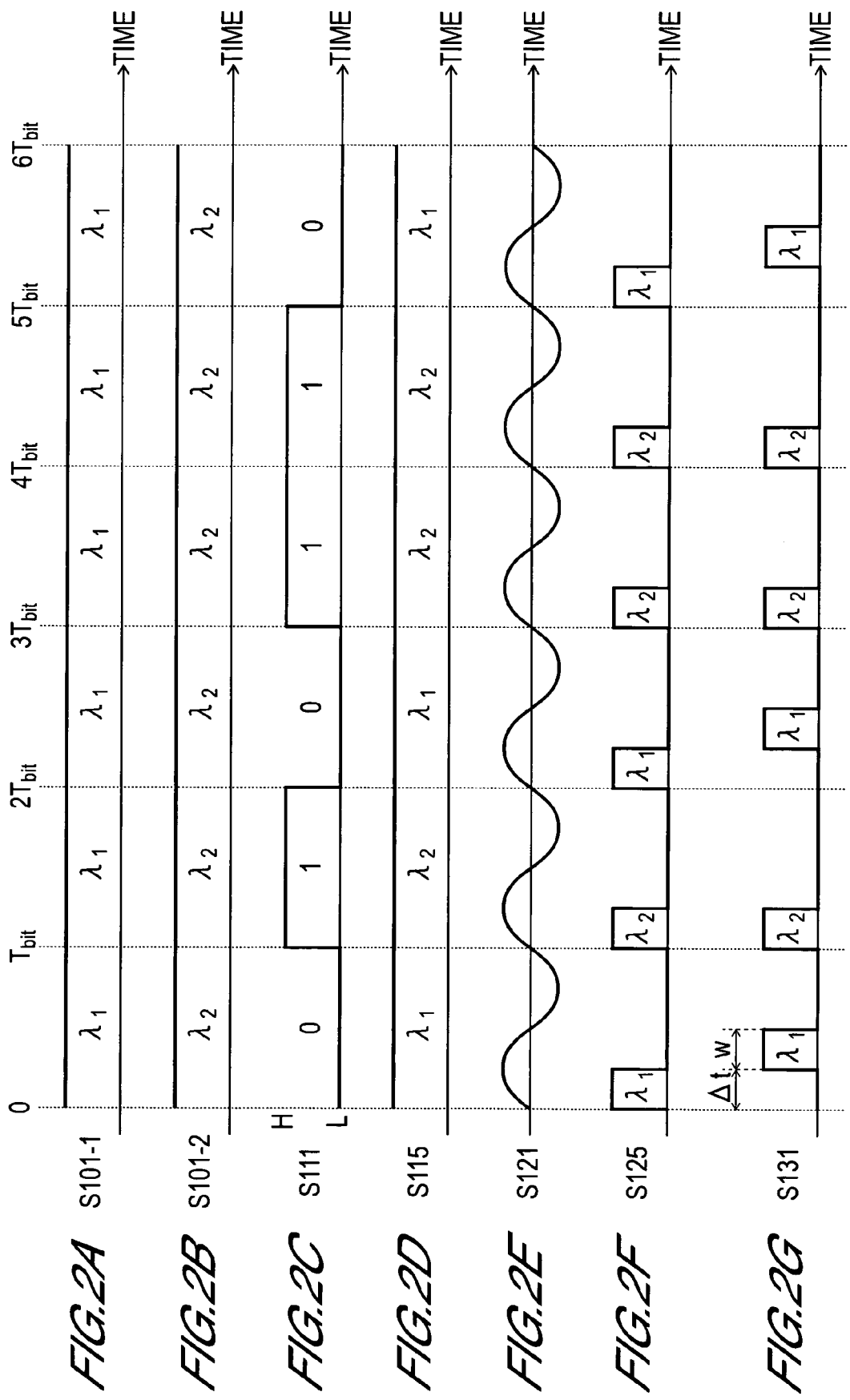
FIGS. 2A, 2B, 2C, 2D, 2E, 2F, and 2G are time charts showing an operational principle of the optical modulating circuit according to the first embodiment.

The first light source 15-1 and the second light source 15-2 are constituted by, for example, arbitrary preferable conventional known semiconductor lasers such as distributed feedback (DFB) semiconductor lasers, Fabry-Perot (FP) semiconductor lasers, and so on. The first light source 15-1 generates a continuous light having a first wavelength λ1 as a wavelength of a carrier wave as a first single wavelength signal (indicated by an arrow S101-1 in FIG. 1) (FIG. 2A). The second light source 15-2 generates a continuous light having a second wavelength λ2 different from the wavelength λ1 as a wavelength of a carrier wave as a second single wavelength signal (indicated by an arrow S101-2 in FIG. 1) (FIG. 2B).

The optical switch 30 includes two optical input ports, i.e., a first optical input port 34 and a second optical input port 36. The optical switch 30 further includes an electric input port 37 and an optical output port 38.

The first single wavelength signal S101-1 generated by the first light source 15-1 is input to the optical switch 30 through the first optical input port 34 as a first switch input signal. The second single wavelength signal S101-2 generated by the second light source 15-2 is input to the optical switch 30 through the second optical input port 36 as a second switch input signal.

A transmission electric signal (indicated by an arrow S111 in FIG. 1) having transmission information is input to the electric input port 37 as a switching signal. The transmission electric signal S111 is an NRZ signal having $T_{bit}$ as a data cycle. The transmission electric signal S111 has digital information "0" or "1" as information to be transmitted. In response to the information "0" or "1", the transmission electric signal S111 set in a state at Low (L) level or High (H) level (FIG. 2C).

When the transmission electric signal S111 indicates the information "0", i.e., when the transmission electric signal S111 is set at L level, the optical switch 30 selects an optical signal input from the first optical input port 34, in this case, the first single wavelength signal S101-1 as a switch output signal. On the other hand, when the transmission electric signal S111 indicates the information "1", i.e., the transmission electric signal S111 is set at H level, the optical switch 30 selects an optical signal input from the second optical input port 36, in this case, the second single wavelength signal S101-2 as a switch output signal. The optical switch 30 outputs the selected switch output signal as an input optical signal (indicated by an arrow S115 in FIG. 1). In this manner, the optical switch 30 outputs the optical signal input from any one of the first optical input port 34 and the second optical input port 36 from the optical output port 38 according to the transmission electric signal S111 input to the electric input port 37. As a result, when the transmission electric signal S111 is at L level, the wavelength of the carrier wave of the input optical signal S115 is λ1. On the other hand, when the transmission electric signal S111 is at H level, the carrier wave of the input optical signal S115 is λ2. The input optical signal S115 is a continuous light and becomes an FSK (Frequency Shift Keying) signal having wavelengths, i.e., frequencies changed depending on the data cycle $T_{bit}$ (FIG. 2D).

The optical modulator 50 includes one optical input port, one electric input port, and an optical output port. The input optical signal S115 is input to the optical input port. To the electric input port, a clock signal (indicated by an arrow S121 in 2E) having a frequency $f(=1/T_{bit})$ equal to a data rate of the transmission electric signal is input in synchronism with the transmission electric signal S111 (FIG. 2E). The optical modulator 50 modulates the input optical signal S115 in intensity to obtain an optical pulse train having a frequency equal to that of the clock signal S121, i.e., an optical pulse train obtained by arranging optical pulses at time intervals equal to the cycle of the clock signal S121. A wavelength of a carrier wave of the optical pulse train is set at λ1 or λ2 depending on the optical pulses. The optical modulator 50 outputs the optical pulse train from the optical output port as an optical pulse signal (indicated by S125 in FIG. 1).

As the optical modulator 50, for example, an Electro-absorption modulator (EAM) can be used. Using a change in absorption of light depending on a voltage applied to the electric input port, it is possible to operate the EAM as an intensity modulator. In the EAM, since a relationship between a voltage to be applied to an amount of absorption of light is nonlinear, an optical pulse train can be generated from a continuous light (for example, see S. Kutsuzawa et al., "10 Gb/s×2 ch signal unrepeated transmission over 100 km of data rate enhanced time-spread/wavelength-hopping OCDM using 2.5 Gb/s-FBG en/decoder", IEEE Photon. Technol. Lett., vol. 15, No. 2, pp. 317-319, February 2003). For example, a 10-GHz voltage having a sine wave is applied to the EAM as a clock signal to make it possible to generate an optical pulse train having a pulse width (full-value halfwidth) w of 14 ps, i.e., a pulse width which is 14% a cycle T (=100 ps=1/10 GHz) of the sine wave.

The delaying unit 60 includes one input port and one output port. The delaying unit 60 delays the optical pulse signal S125 input from the input port by different delay times with respect to an optical pulse having the wavelength λ1 as a wavelength of a carrier wave and an optical pulse having the wavelength λ2 as a wavelength of a carrier wave. In this case, a difference between the delay times in the delaying unit 60 with respect to the optical pulse having the wavelength λ1 of the carrier wave and the optical pulse having the wavelength λ2 of the carrier wave is represented by Δt. As a result, the delaying unit 60 generates a pulse position modulation (PPM) signal (indicated by an arrow S131 in FIG. 2G) obtained by performing pulse position modulation to the optical pulse signal S125 to output the PPM signal S131 from the output port (FIG. 2G).

Figure 3:
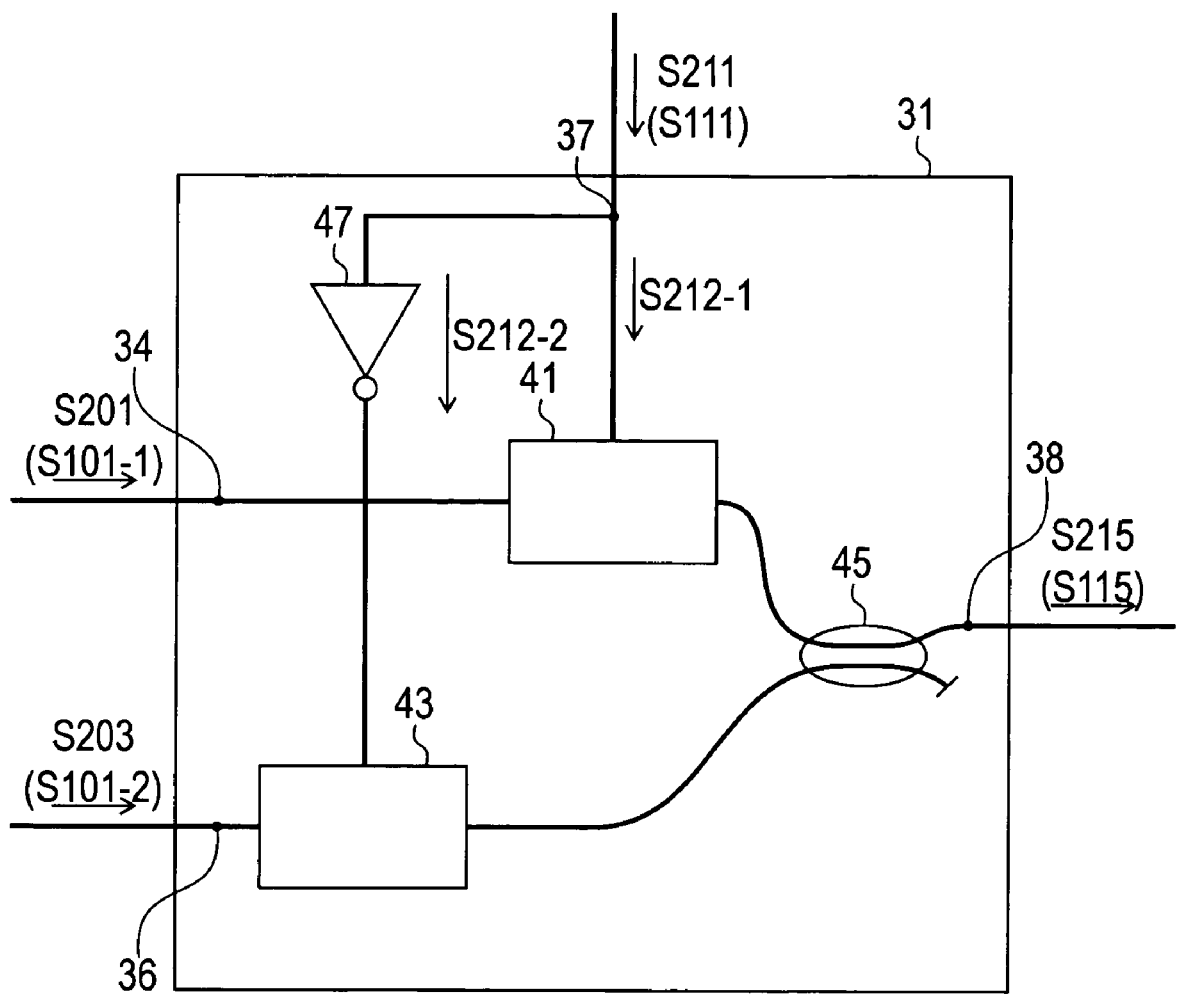
FIG. 3 is a block diagram of an optical switch using an Electro-absorption modulator.

Referring to FIG. 3, an optical switch using the EAM will be described below as a preferred embodiment of an optical switch.

An optical switch 31 using the EAM includes a first EAM 41, a second EAM 43, an optical coupler 45, and an inverting circuit 47.

To the first EAM 41, the first single wavelength signal S101-1 is input through the first optical input port 34 of the optical switch 31 as a first switch input signal (indicated by an arrow S201 in FIG. 3). To the second EAM 43, the second single wavelength signal S101-2 is input through the second optical input port 36 of the optical switch 31 as a second switch input signal (indicated by an arrow S203 in FIG. 3).

The transmission electric signal S111 input through the electric input port 37 of the optical switch 31 as a switching signal (indicated by an arrow S211 in FIG. 3) is divided by two into a first switching signal (indicated by an arrow S212-1 in FIG. 3) and a second switching signal (indicated by an arrow S212-2 in FIG. 3) in the optical switch 31. The first switching signal S212-1 is transmitted to the first EAM 41. The second switching signal S212-2 is transmitted to the second EAM 43 through the inverting circuit 47.

The first EAM 41 and the second EAM 43 pass or block the first switch input signal S201 and the second switch input signal S203 depending on a voltage of the switching signal S211, respectively.

The first switching signal S212-1 is input to the first EAM 41. Therefore, when the information of the transmission electric signal S111 is "0", i.e., when the switching signal S211 is at L level, the first EAM 41 passes the first switch input signal S201 to output the first switch input signal S201. On the other hand, when the information of the transmission electric signal S111 is "1", i.e., when the switching signal S211 is at H level, the first EAM 41 blocks the first switch input signal S201 not to output the first switch input signal S201.

To the second EAM 43, the second switching signal S212-2 is inverted by the inverting circuit 47 and then input. Therefore, when the switching signal S211 is at L level, the second switching signal S212-2 input to the second EAM 43 goes to H level. At this time, the second EAM 43 blocks the second switch input signal S203 not to output the second switch input signal S203. On the other hand, when the switching signal S211 at H level, the second switching signal S212-2 input to the second EAM 43 goes to L level. At this time, the second EAM 43 passes the second switch input signal S203 to output the second switch input signal S203.

The optical coupler 45 couples signals output from the first EAM 41 and the second EAM 43 to output a switch output signal (indicated by an arrow S215 in FIG. 3) from the optical output port 38. At this time, the optical coupler 45 outputs another signal in a state equal to that of the switch output signal S215 from another port different from the port from which the switch output signal is output. However, this signal is terminated when the signal is output from the optical coupler 45 and is not output from the optical switch 31.

The first switching signal S212-1 is input to the first EAM 41 without passing through the inverting circuit 47. On the other hand, the second switching signal S212-2 is input to the second EAM 43 through the inverting circuit 47. For this reason, electric signals input to the first EAM 41 and the second EAM 43 are inverted from each other in polarity. Therefore, when the first EAM 41 is in a passing state, the second EAM 43 is a blocking state. On the other hand, when the first EAM 41 is in the blocking state, the second EAM 43 is in the passing state. As a result, an output signal from the optical coupler 45 is a continuous light including any one of the wavelength λ1 of the carrier wave of the first switch input signal S201 and the wavelength λ2 of the carrier wave of the second switch input signal S203 as a wavelength of a carrier wave depending on the data cycle $T_{bit}$, i.e., an FSK signal.

Figure 4:
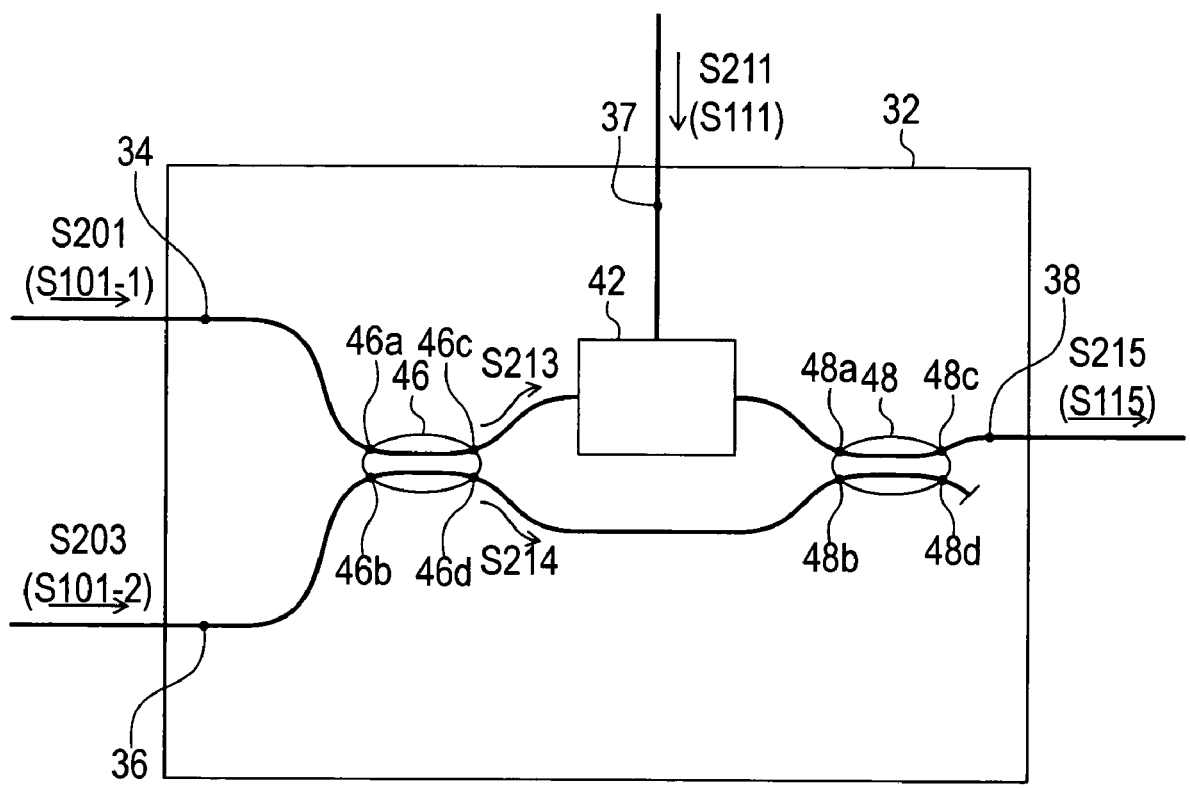
FIG. 4 is a block diagram of an optical switch using a Mach-Zehnder interferometer.

With reference to FIG. 4, an optical switch using an interferometer will be described below as another preferred embodiment of an optical switch.

An optical switch 32 includes a first optical coupler 46, a second optical coupler 48, and an optical phase modulator 42. As the first optical coupler 46 and the second optical coupler 48, arbitrary preferable conventionally known optical couplers can be used. As the optical phase modulator 42, for example, a Lithium Niobate (LN) optical modulator can be used.

The first optical coupler 46 includes two input ports, i.e., a first input port 46*a* and a second input port 46*b* and two output ports, i.e., a first output port 46*c* and a second output port 46*d*.

A first switch input signal S201 (S101-1) input to the first optical input port 34 of the optical switch 32 is input to the first optical coupler 46 through the first input port 46*a*. The first optical coupler 46 divides the first switch input signal S201 by two. The first optical coupler 46 outputs one of the divided signals from the first output port 46*c*, and outputs the other from the second output port 46*d*. In this case, light input from the first input port 46*a* and crossing the first optical coupler 46, i.e., light output from the second output port 46*d* is delayed in phase by π/2 with reference to light output from the first output port 46*c*.

Similarly, the second switch input signal S203 (S101-2) input to the second optical input port 36 of the optical switch 32 is input to the first optical coupler 46 through the second input port 46*b*. The first optical coupler 46 divides the second switch input signal S203 by two. The first optical coupler 46 one of the divided signals from the first output port 46*c* and outputs the other from the second output port 46*d*. Light input from the second input port 46*b* and crossing the first optical coupler 46, i.e., light output from the first output port 46*c* is delayed in phase by π/2 with reference to light output from the second output port 46*d*.

In the following explanation, light input from the first input port 46*a* or the second input port 46*b* and output from the first output port 46*c* is called a first branch signal (indicated by an arrow S213 in FIG. 4). Light input from the first input port 46*a* or the second input port 46*b* and output from the second output port 46*d* is called a second branch signal (indicated by an arrow S214 in FIG. 4).

The first branch signal S213 is transmitted to the second optical coupler 48 through the optical phase modulator 42. The second branch signal S214 is transmitted to the second optical coupler 48 without passing through the optical phase modulator 42.

To the optical phase modulator 42, the transmission electric signal S111 input to the optical switch as the switching signal S211 is input. The optical phase modulator 42 changes the input first branch signal S213 in phase by a voltage value of the switching signal S211 to output the first branch signal S213. For example, when the information of the transmission electric signal S111 is "0", i.e., when the switching signal S211 is at L level, the optical phase modulator 42 changes the first branch signal S213 by a phase θ0 to output the first branch signal S213. On the other hand, when the information of the transmission electric signal S111 is "1", i.e., when the switching signal S211 is at H level, the optical phase modulator 42 changes the first branch signal S213 by a phase θ1 to output the first branch signal S213.

The second optical coupler 48 includes two input ports, i.e., a first input port 48*a* and a second input port 48*b* and two output ports, i.e., a first output port 48*c* and a second output port 48*d*.

The first branch signal S213 is input to the second optical coupler 48 through the first input port 48*a*. The second optical coupler 48 divides the first branch signal S213 by two. The second optical coupler 48 outputs one of the divided signals from the first output port 48*c* and outputs the other from the second output port 48*d*.

Similarly, the second branch signal S214 is input to the second optical coupler 48 through the second input port 48*b*. The second optical coupler 48 divides the second branch signal S214 by two. The second optical coupler 48 outputs one of the divided signals from the first output port 48*c* and outputs the other from the second output port 48*d*. In this case, light input from the second input port 48*b* and crossing the second optical coupler 48, i.e., light output from the first output port 48*c* is delayed in phase by π/2 with reference to light output from the second output port 48*d*.

A signal output from the first output port 48*c* of the second optical coupler 48 is output from the optical switch 32 as the switch output signal S215. A signal output from the second output port 48*d* is terminated at a position where the signal is output from the second optical coupler 48 and is not output from the optical switch 32.

The first switch input signal S201 input to the first optical coupler 46 is output from the first output port 48*c* of the second optical coupler 48 in different phases when the first switch input signal S201 is output from the first output port 46*c* of the first optical coupler 46 and when the first switch input signal S201 is output from the second output port 46*d* of the first optical coupler 46.

A phase shift of the first branch signal S213 input from the first input port 46*a* of the first optical coupler 46 and output from the first output port 46*c* in the first optical coupler 46 is 0. The first branch signal S213 is subjected to phase modulation of θi (i=0, 1) by the optical phase modulator 42 depending on a level of the switching signal S211 and input to the first input port 48*a* of the second optical coupler 48. A phase shift of a signal input from the first input port 48*a* of the second optical coupler 48 and output as the switch output signal S215 from the first output port 48*c* is 0 in the second optical coupler 48. Therefore, when the first switch input signal S201 is output from the first output port 46*c* of the first optical coupler 46, a phase shift in the optical switch 32 is θi (=0+θi+0).

A phase shift of the second branch signal S214 input from the first input port 46*a* of the first optical coupler 46 and output from the second output port 46*d* in the first optical coupler 46 is π/2. The second branch signal S214 is input to the second input port 48*b* of the second optical coupler 48. A phase shift of a signal input from the second input port 48*b* of the second optical coupler 48 and output as the switch output signal S215 from the first output port 48*c* in the second optical coupler 48 is π/2. Therefore, when the first switch input signal S201 is output from the first input port 46*b* of the first optical coupler 46, a phase shift in the optical switch 32 is π (=π/2+π/2).

In this manner, a phase difference between the first switch input signals S201 on two different paths when the first switch input signal S201 passes through the optical phase modulator 42 and when the first switch input signal S201 does not pass through the optical phase modulator 42 is θi−π (or π−θi).

The second switch input signal S203 output from the first output port 48c of the second optical coupler 48 has different phases between when the second switch input signal S203 is output from the first output port 46c of the first optical coupler 46 and when the second switch input signal S203 is output from the second output port 46d of the first optical coupler 46.

A phase shift of the first branch signal S213 input from the second input port 46b of the first optical coupler 46 and output from the first output port 46c in the first optical coupler 46 is $\pi/2$. The first branch signal S213 is subjected to phase modulation of $\theta i$ (i=0, 1) by the optical phase modulator 42 depending on a level of the switching signal S211 and input to the first input port 48a of the second optical coupler 48. A phase shift of a signal input from the first input port 48a of the second optical coupler 48 and output as the switch output signal S215 from the first output port 48c in the second optical coupler 48 is 0. Therefore, when the second switch input signal S203 is output from the first output port 46c of the first optical coupler 46, a phase shift of the optical switch 32 is $\theta i+\pi/2$ (=$0+\theta i+\pi/2$).

A phase shift of the second branch signal S214 input from the second input port 46b of the first optical coupler 46 and output from the second output port 46d in the first optical coupler 46 is 0. The second branch signal S214 is input to the second input port 48b of the second optical coupler 48. A phase shift of a signal input from the second input port 48b of the second optical coupler 48 and output as the switch output signal S215 from the first output port 48c in the second optical coupler 48 is $\pi/2$. Therefore, when the second switch input signal S203 is output from the second output port 46d of the first optical coupler 46, a phase shift in the optical switch 32 is $\pi/2$ (=$0+\pi/2$).

In this manner, a phase difference between the second switch input signals S203 on two different paths when the second switch input signal S203 passes through the optical phase modulator 42 and the second switch input signal S203 does not pass through the optical phase modulator 42 is $\theta i$ (=($\theta i+\pi/2$)$-\pi/2$).

Therefore, when the optical phase modulator 42 is designed to satisfy $\theta 0=\pi$ and $\theta 1=0$, a phase difference between the first switch input signals S201 input from the first optical input port 34 on two paths is 0 (=$\theta 0-\pi$) when the transmission electric signal S111 has information "0". As a result, the first switch input signal S201 is output as the switch output signal S215. At this time, a phase difference between the second switch input signals S203 input from the second optical input port 36 on two paths is $\pi$ (=$\theta 0$). As a result, the second switch input signal S203 is not output as the switch output signal S215.

Similarly, when the transmission electric signal S111 has information "1", the first switch input signal S201 is not output because the phase difference between the first switch input signals S201 on the two paths is $\pi$ (=$\pi-\theta 1$). At this time, the second switch input signal S203 is output as the switch output signal S215 because the phase difference between the second switch input signal S203 on the two paths is 0 (=$\theta 1$).

A delaying unit using a fiber bragg grating (FBG) will be described below as a preferred embodiment of the delaying unit with reference to FIG. 5.

The delaying unit 60 includes an optical circulator 62 and a FBG delayer 64. The optical circulator 62 transmits an optical pulse signal S125 input from an input port to the FBG delayer 64 and outputs a PPM signal S131 obtained by the FBG delayer 64 (will be described later) from an output port.

The FBG delayer 64 uses bragg reflection. The FBG delayer 64 strongly reflects light having a wavelength $\lambda$ which satisfies $\lambda=2\times n\times\Lambda$ where a cycle of a diffraction grating is $\Lambda$ and a refraction index of an optical fiber is n, and transmits light having other wavelengths. Therefore, a predetermined amount of delay can be given to an optical pulse depending on a distance between a position where a diffraction grating is formed and an end of the FBG and a wavelength of a carrier wave. The FBG delayer 64 is constructed such that a plurality of diffraction gratings having different cycles $\Lambda$ is arranged as unit FBGs in an optical fiber 65. With this configuration, different amounts of delay can be given to optical pulses having different wavelengths of carrier waves, respectively. The FBG delayer 64 sequentially includes a first unit FBG 66a and a second unit FBG 66b in the optical fiber 65 in a propagating direction of light in the optical fiber 65. In this case, the first unit FBG 66a is formed to cause a cycle $\Lambda 1$ of the diffraction grating to satisfy $\lambda 1=2\times n\times\Lambda 1$, and the second unit FBG 66b is formed to cause a cycle $\Lambda 2$ of the diffraction grating to satisfy $\lambda 2=2\times n\times\Lambda 2$. The second unit FBG 66b is arranged at a position near an input terminal of the optical pulse signal S125 from the optical circulator 62, and the first unit FBG 66a is arranged at a position far from the input terminal.

Figure 5:
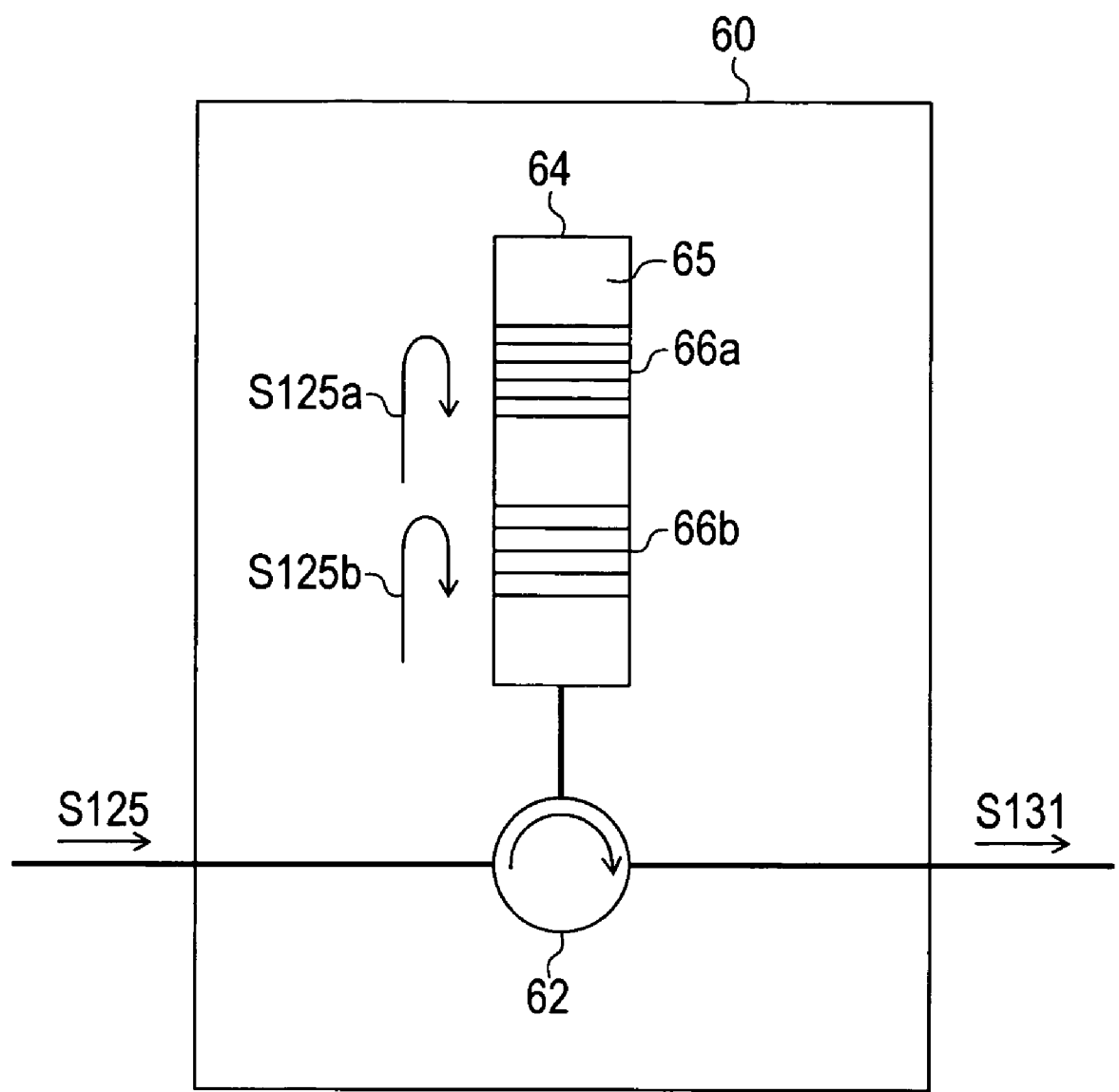
FIG. 5 is a schematic diagram of a delaying unit using an FBG.
Figure 6:
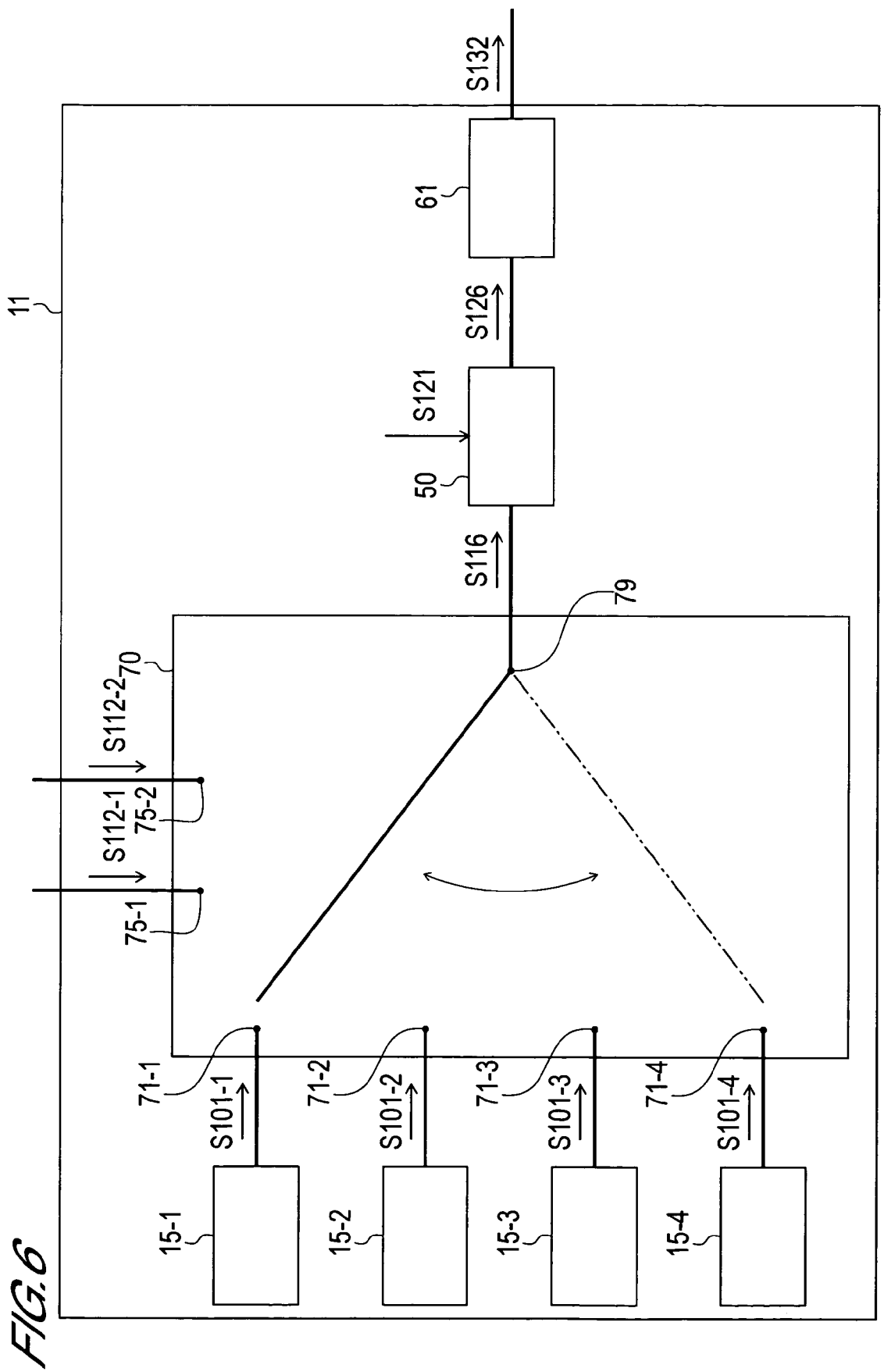
FIG. 6 is a block diagram showing a configuration of an optical modulating circuit according to a second embodiment.

The first unit FBG 66a reflects light having a first wavelength $\lambda 1$ as a wavelength of a carrier wave as indicated by an arrow S125a in FIG. 5. The second unit FBG 66b reflects light having a second wavelength $\lambda 2$ as a wavelength of a carrier wave as indicated by an arrow S125b in FIG. 5. Due to a difference between positions of the propagating directions of light of the first unit FBG 66a and the second unit FBG 66b in the optical fiber 65, optical pulses reflected by the first unit FBG 66a and the second unit FBG 66b have a time difference $\Delta t$ as a difference between different delay times. As a result, on the basis of a position of the optical pulse having the second wavelength $\lambda 2$ of the carrier wave on a time axis, references are determined on the time axis at intervals equal to a clock cycle. In this case, the optical pulse having the first wavelength $\lambda 1$ of the carrier wave is delayed from the reference by $\Delta t$. In this manner, a PPM signal can be obtained as an optical signal from an optical pulse signal.

According to the optical modulating circuit and the optical modulating method according to the first embodiment, optical pulses having different wavelengths of carrier waves changed depending on transmission information to delay the optical pulses by delay times changed depending on the wavelengths. As a result, PPM can be realized by using an electric circuit having a frequency band equal to a data rate.

When an FBG delayer is used in the delaying unit, unit FBG which reflect lights having two different wavelengths may be formed, and a simple circuit configuration can be realized.

As optical switches used to obtain an input optical signal from two continuous lights having different wavelengths, an optical switch using two EAMs or an optical switch using a Mach-Zehnder interferometer may be used. When the two EAMs are used, two electric signals are required to operate the EAMs. However, since optical interference is not used, a single wavelength signal may be random polarized light.

On the other hand, when the Mach-Zehnder interferometer is used, optical interference is used. For this reason, random polarized light is not used as a single wavelength signal, and coherency must be made high. However, only one electric signal may be used to operate an optical phase modulator. As a light source having a high coherency, a DFB laser may be used.

Second Embodiment

An optical modulating circuit and an optical modulating method according to a second embodiment will be described below with reference to FIGS. 6 and 7A to 7I. In FIGS. 7A to 7I, time is plotted along the horizontal axes. As magnitudes of respective signals, voltages of electric signals and light intensities of optical signals are plotted along the vertical axes.

The optical modulating circuit and the optical modulating method according to the second embodiment are an optical modulating circuit and an optical modulating method which are used when 2-bit information is transmitted for a 1-data cycle $T_{2bits}$ and which perform pulse position modulation of 4 (=$2^2$) values.

An optical modulating circuit 11 is constituted by first to fourth light sources 15-1 to 15-4, an optical switch unit 70, an optical modulator 50, and a delaying unit 61. Since the optical modulator 50 can be formed to have the same configuration as described in the first embodiment, a description thereof will be omitted.

Figure 7:
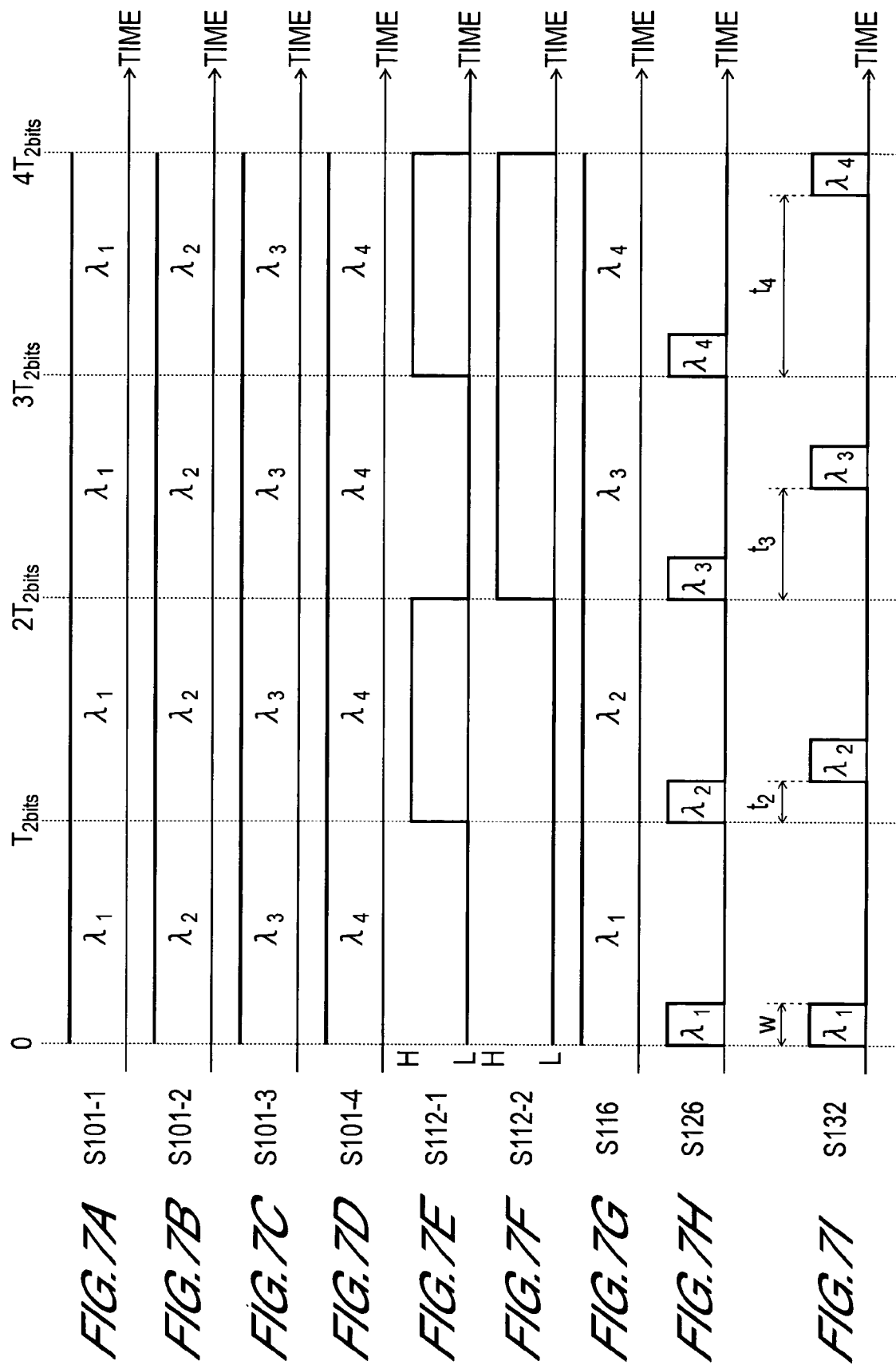
FIGS. 7A, 7B, 7C, 7D, 7E, 7F, 7G, 7H, and 7I are time charts showing an operational principle of the optical modulating circuit according to the second embodiment.

The first to fourth light sources 15-1 to 15-4 are constituted by, for example, an arbitrary preferable conventional known semiconductor lasers, respectively, and generate continuous lights having, as wavelengths of carrier waves, a first wavelength $\lambda 1$, a second wavelength $\lambda 2$, a third wavelength $\lambda 3$, and a fourth wavelength $\lambda 4$ which are different from each other. The first light source 15-1 generates a continuous light having the wavelength $\lambda 1$ of the carrier wave as a first single wavelength signal S101-1 (FIG. 7A). The second light source 15-2 generates a continuous light having the wavelength $\lambda 2$ of the carrier wave as a second single wavelength signal S101-2 (FIG. 7B). The third light source 15-3 generates a continuous light having the wavelength $\lambda 3$ of the carrier wave as a third single wavelength signal S101-3 (FIG. 7C). The fourth optical light source 15-4 generates a continuous light having the wavelength $\lambda 4$ of the carrier wave as a fourth single wavelength signal S101-4 (FIG. 7D).

The optical switch unit 70 includes four optical input ports, i.e., first to fourth optical input ports 71-1 to 71-4, two electric input ports, i.e., a first electric input port 75-1 and a second electric input port 75-2, and an optical output port 79. The optical switch unit 70 outputs an optical signal input from any one of the first to fourth optical input ports 71-1 to 71-4 from the optical output port 79 depending on electric signals input to the first electric input port 75-1 and the second electric input port 75-2.

The first single wavelength signal S101-1 generated by the first light source 15-1 is input to the optical switch unit 70 as a first switch input signal through the first optical input port 71-1. The second single wavelength signal S101-2 generated by the second light source 15-2 is input to the optical switch unit 70 as a second switch input signal through the second optical input port 71-2. The third single wavelength signal S101-3 generated by the third light source 15-3 is input to the optical switch unit 70 as a third switch input signal through the third optical input port 71-3. The fourth single wavelength signal S101-4 generated by the fourth light source 15-4 is input to the optical switch unit 70 as a fourth switch input signal through the fourth optical input port 71-4.

To the first electric input port 75-1 and the second electric input port 75-2, a first transmission electric signal (indicated by an arrow S112-1 in FIG. 6) and a second transmission electric signal (indicated by an arrow S112-2 in FIG. 6) are input as switching signals, respectively. The first transmission electric signal S112-1 and the second transmission electric signal S112-2 are electric signals in an NRZ format having a data cycle of $T_{2bits}$. The first transmission electric signal S112-1 and the second transmission electric signal S112-2 set at L level or H level depending on 2-bit digital information "00", "01", "10", or "11".

The first transmission electric signal S112-1 expresses information of a lower bit (also called a first bit). When the first transmission electric signal S112-1 is at L level, the first bit is "0". On the other hand, when the first transmission electric signal S112-2 is at H level, the first bit is "1".

The second transmission electric signal S112-2 expresses information of an upper bit (also called a second bit). When the second transmission electric signal S112-2 is at L level, the second bit is "0". On the other hand, when the second transmission electric signal S112-2 is at H level, the second bit is "1".

When the 2-bit digital information to be transmitted is "00", both the first transmission electric signal S112-1 and the second transmission electric signal S112-2 go to L level. When the digital information is "01", the first transmission electric signal S112-1 goes to H level, and the second transmission electric signal S112-2 goes to L level. When the digital information is "10", the first transmission electric signal S112-1 goes to L level, and the second transmission electric signal S112-2 goes to H level. Furthermore, when the digital information is "11", both the first transmission electric signal S112-1 and the second transmission electric signal S112-2 go to H level. The time charts in FIGS. 7E and 7F show states in which the digital information changes in the order named: "00", "01", "10", and "11" every bit cycle $T_{2bits}$.

When the digital information is "00" the optical switch unit 70 selects an optical signal input from the first input port, in this case, the first single wavelength signal S101-1 as a switch output signal. When the digital information is "01", the optical switch unit 70 selects an optical signal input from the second input port, in this case, the second single wavelength signal S101-2 as a switch output signal. When the digital information is "10", the optical switch unit 70 selects an optical signal input from the third input port, in this case, the third single wavelength signal S101-3 as a switch output signal. When the digital information is "11", the optical switch unit 70 selects an optical signal input from the fourth input port, in this case, the fourth single wavelength signal S101-4 as a switch output signal. The optical switch unit 70 outputs a switch output signal obtained by the selection as an input optical signal S116.

When the digital signal is "00", a wavelength of a carrier wave of the input optical signal S116 is $\lambda 1$. When the digital signal is "01", the wavelength of the carrier wave of the input optical signal S116 is $\lambda 2$. When the digital signal is "10", the wavelength of the carrier wave of the input optical signal S116 is $\lambda 3$. When the digital signal is "11", the wavelength of the carrier wave of the input optical signal S116 is $\lambda 4$. The input optical signal S116 is a continuous light and serves as an FSK signal the wavelength of which changes every data cycle $T_{2bits}$, i.e., the frequency of which changes (FIG. 7G).

Figure 8:
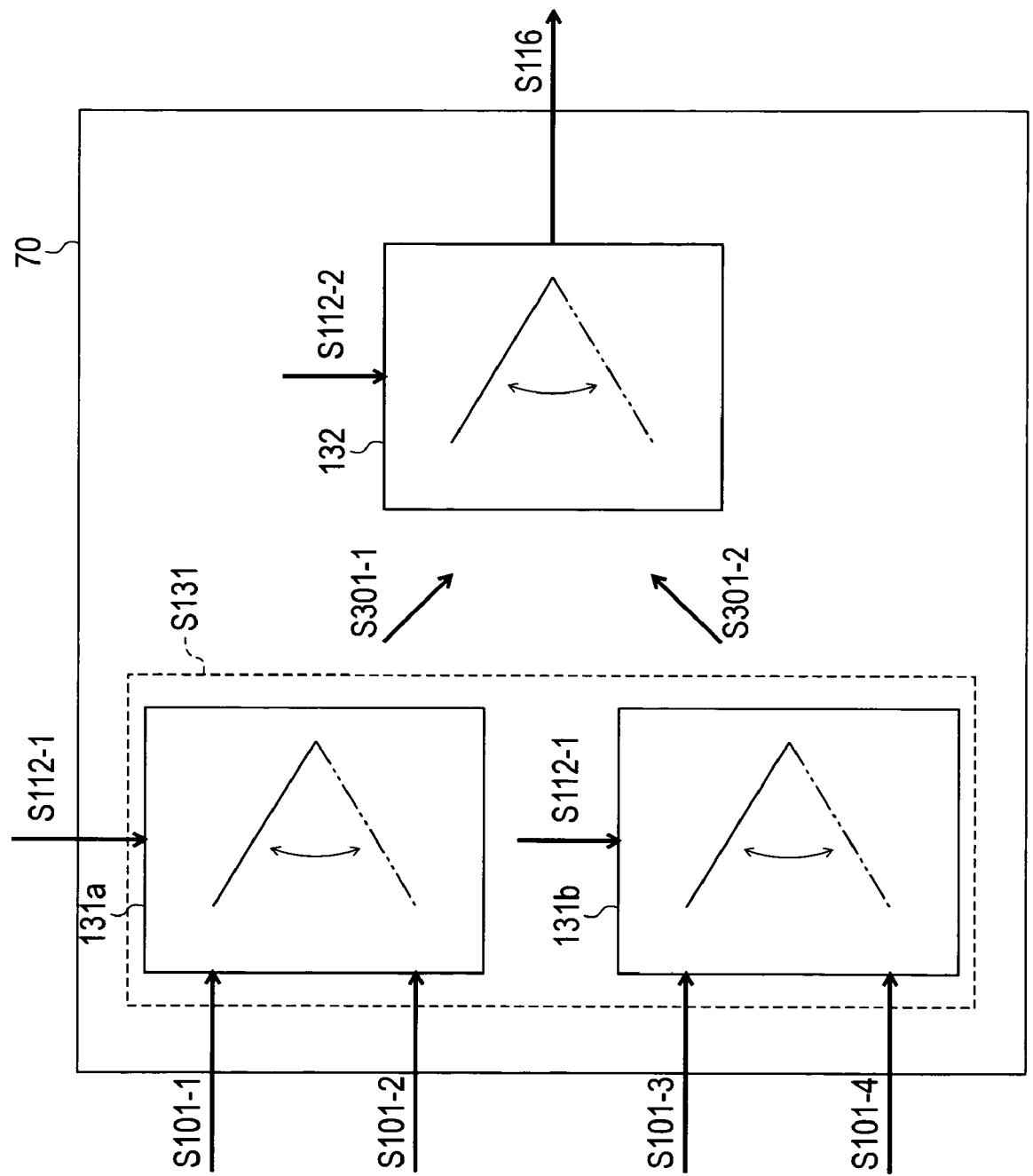
FIG. 8 is a block diagram of a 4×1 optical switch unit.

An optical switch unit which selects one of four inputs to output the selected input will be described below with reference to FIG. 8.

The optical switch unit 70 includes a first-step switch (to be referred to as a 1-step switch) 131 including first and second sub-switches 131a and 131b and a second-step switch (to be referred to as a 2-step switch) 132.

To the first sub-switch 131a, the first single wavelength signal S101-1 and the second single wavelength signal S101-2 are input as first and second switch input signals, respectively. To the first sub-switch 131a, the first transmission electric signal S112-1 is input as a switching signal. When the first transmission electric signal S112-1 is at L level, the first sub-switch 131a selects the first single wavelength signal S101-1 as a switch output signal. On the other hand, when the first transmission electric signal S112-1 is at H level, the first sub-switch 131a selects the second single wavelength signal S101-2 as a switch output signal. The first sub-switch 131a outputs the selected switch output signal as a first sub-switch signal (indicated by an arrow S301-1 in FIG. 8).

To the second sub-switch 131b, the third single wavelength signal S101-3 and the fourth single wavelength signal S101-4 are input as first and second switch input signals, respectively. To the second sub-switch 131b, the first transmission electric signal S112-1 is input as a switching signal. When the first transmission electric signal S112-1 is at L level, the second sub-switch 131b selects the third single wavelength signal S101-3 as a switch output signal. On the other hand, when the first transmission electric signal S112-1 is at H level, the second sub-switch 131b selects the fourth single wavelength signal S101-4 as a switch output signal. The second sub-switch 131b outputs the selected switch output signal as a second sub-switch signal (indicated by an arrow S301-2 in FIG. 8).

To the 2-step switch 132, the first sub-switch signal S301-1 and the second sub-switch signal S301-2 are input as first and second switch input signals, respectively. To the 2-step switch 132, the second transmission electric signal S112-2 is input as a switching signal. When the second transmission electric signal S112-2 is at L level, the 2-step switch 132 selects the first sub-switch signal S301-1 as a switch output signal. On the other hand, when the second transmission electric signal S112-2 is at H level, the 2-step switch 132 selects the second sub-switch signal S301-2 as a switch output signal. The 2-step switch 132 outputs the selected switch output signal as the input optical signal S116.

As each of the first sub-switch 131a, the second sub-switch 131b, and the 2-step switch 132, any one of an optical switch using the EAMs explained with reference to FIG. 3 and an optical switch using the interferometer explained with reference to FIG. 4 can be used. In this case, detailed descriptions of the first sub-switch 131a, the second sub-switch 131b, and the 2-step switch 132 will be omitted.

The optical modulator 50 performs intensity modulation to the input optical signal S116 to obtain an optical pulse train having a frequency equal to that of the clock signal S121. The optical modulator 50 outputs the optical pulse train as an optical pulse signal (indicated by S126 in FIG. 6) (FIG. 7H).

The delaying unit 61 includes one input port and one output port. The delaying unit 61 delays the optical pulse signal S126 input from the input port by different delay times with respect to optical pulses having the wavelengths $\lambda 1$, $\lambda 2$, $\lambda 3$, and $\lambda 4$ of carrier waves. As a result, the delaying unit 61 obtains a pulse position modulating signal (indicated by an arrow S132 in FIG. 6) obtained by performing pulse position modulation to the optical pulse signal S126 and outputs the pulse position modulating signal S132 from an output port (FIG. 7I).

A delaying unit using an FBG will be described below as a preferred embodiment of a delaying unit with reference to FIG. 9.

The delaying unit 61 includes an optical circulator 62 and an FBG delayer 67. The optical circulator 62 transmits an optical pulse signal S126 input from the input port to the FBG delayer 67 and outputs the pulse position modulating signal S132 obtained by the FBG delayer 67 as described below from the output port.

The FBG delayer 67 is constructed such that a plurality of diffraction gratings having different cycles $\Lambda$ is arranged in the optical fiber 68. With this configuration, different amounts of delay are given to optical pulses having different wavelengths of carrier waves. In the FBG delayer 67 of this configuration, a first unit FBG 69a, a second unit FBG 69b, a third unit FBG 69c, and a fourth unit FBG 69d are sequentially arranged in the optical fiber 68 in a propagating direction of light. In this case, the first unit FBG 69a is formed such that a cycle $\Lambda 1$ of the diffraction grating satisfies $\lambda 1 = 2 \times n \times \Lambda 1$. The second unit FBG 69b is formed such that a cycle $\Lambda 2$ of the diffraction grating satisfies $\lambda 2 = 2 \times n \times \Lambda 2$. The third unit FBG 69c is formed such that a cycle $\Lambda 3$ satisfies $\lambda 3 = 2 \times n \times \Lambda 3$. The fourth unit FBG 69d is formed such that a cycle $\Lambda 4$ satisfies $\lambda 4 = 2 \times n \times \Lambda 4$. The first unit FBG 69a is arranged at a position near the input terminal of the optical pulse signal S126 from the optical circulator 62, and the fourth unit FBG 69d is arranged at a position far from the input terminal.

Figure 9:
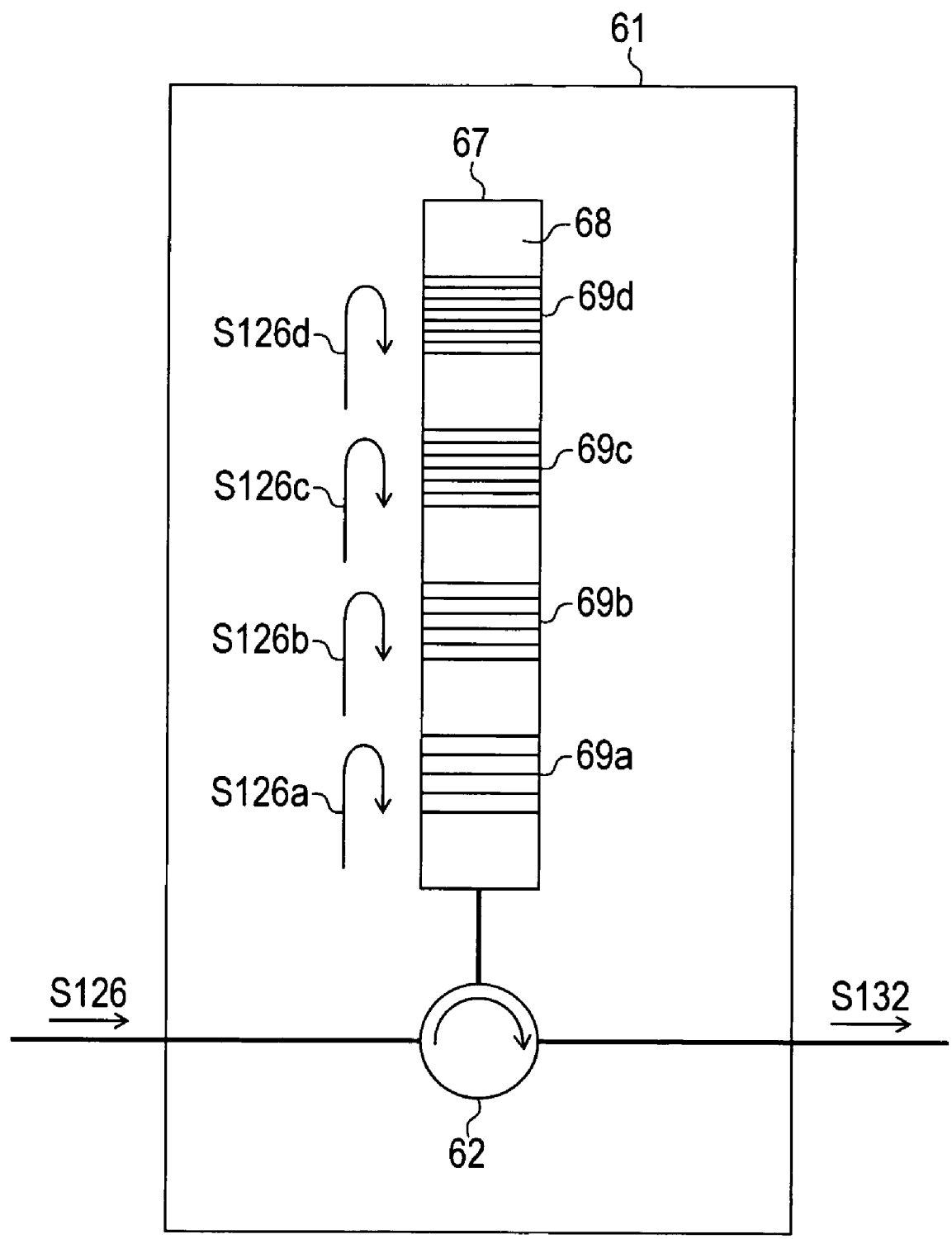
FIG. 9 is a block diagram of a delaying unit for four-valued PPM using an FBG.

The first unit FBG 69a, as indicated by an arrow S126a in FIG. 9, reflects an optical pulse having a wavelength $\lambda 1$ of a carrier wave. The second unit FBG 69b, as indicated by an arrow S126b in FIG. 9, reflects an optical pulse having a wavelength $\lambda 2$ of a carrier wave. The third unit FBG 69c, as indicated by an arrow S126c in FIG. 9, reflects an optical pulse having a wavelength $\lambda 3$ of a carrier wave. The fourth unit FBG 69d, as indicated by an arrow S126d in FIG. 9, reflects an optical pulse having a wavelength $\lambda 4$ of a carrier wave. Due to a difference between positions of the first unit FBG 69a and the second unit FBG 69b in the propagating direction of light in the optical fiber 68, a time difference t2 is generated in the optical pulses reflected by the first unit FBG 69a and the second unit FBG 69b. Due to a difference between positions of the first unit FBG 69a and the third unit FBG 69c in the propagating direction of light in the optical fiber 68, a time difference t3 is generated in the optical pulses reflected by the first unit FBG 69a and the third unit FBG 69c. Due to a difference between positions of the first unit FBG 69a and the forth unit FBG 69d in the propagating direction of light in the optical fiber 68, a time difference t4 is generated in the optical pulses reflected by the first unit FBG 69a and the fourth unit FBG 69d. On the basis of a position on a time axis of the optical pulse having the wavelength $\lambda 1$ of the carrier wave, references are determined at intervals equal to a clock cycle. In this case, the optical pulse having the second wavelength $\lambda 2$ of the carrier wave is delayed by the time difference t2 from the reference. The optical pulse having the third wavelength $\lambda 3$ of the carrier wave is delayed by the time difference t3 from the reference. The optical pulse having the fourth wavelength $\lambda 4$ of the carrier wave is delayed by the time difference t4 from the reference. In this manner, a PPM signal can be obtained as an optical signal from the optical pulse signal (FIG. 7I).

A pulse width w, the delay times t2, t3, and t4 must satisfy the following relational expressions:

$$w \leq t2$$

$$t2 + w < t3$$

$$t3 + w < t4$$

$$t4 + w < T2_{bits}.$$

According to the optical modulating circuit and the optical modulating method of the second embodiment, the same effect as that of the optical modulating circuit and the optical modulating method of the first embodiment can be obtained, and PPM of 2-bit information in a 1-data period can be realized by using an electric circuit having a frequency band equal to a data rate corresponding to the data cycle.

Third Embodiment

Figure 10:
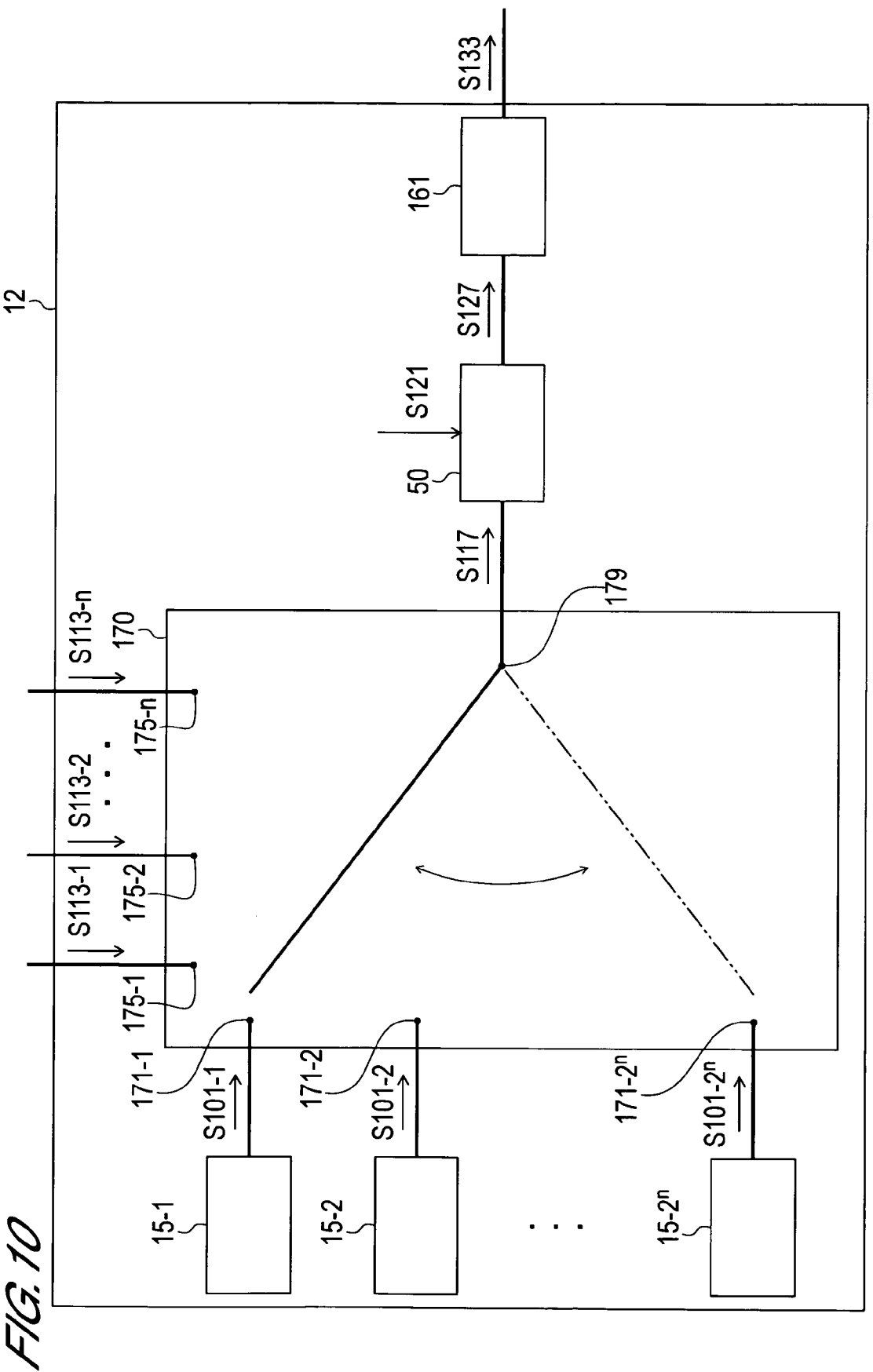
FIG. 10 is a block diagram showing a configuration of an optical modulating circuit according to a third embodiment.

An optical modulating circuit and an optical modulating method according to a third embodiment will be described below with reference to FIG. 10.

In the optical modulating circuit and the optical modulating method according to the third embodiment are an optical modulating circuit and an optical modulating method which are used when n-bit information is transmitted within a 1-data cycle $T_{nbits}$ and perform pulse position modulation of $2^n$ values.

An optical modulating circuit 12 includes first to $2^n$-th light sources 15-1 to 15-2$^n$, an optical switch unit 170, an optical modulator 50, and a delaying unit 161. Since the optical modulator 50 has the same configuration as described in the first embodiment, a description thereof will be omitted.

The first to $2^n$-th light sources 15-1 to 15-2$^n$ are constituted by, for example, arbitrary preferable conventional known semiconductor lasers, respectively, and generate continuous lights having first to $2^n$-th wavelengths λ1 to λ2$^n$ as input first to $2^n$-th optical signals S101-1 to S101-2$^n$.

The optical switch unit 170 includes $2^n$ optical input ports, i.e., first to $2^n$-th optical input ports 171-1 to 171-2$^n$, n electric input ports, i.e., first to nth electric input ports 175-1 to 175-n, and an optical output port 179. The optical switch unit 170 outputs an optical signal input from any one of the first to $2^n$-th optical input ports 171-1 to 171-2$^n$ from the optical output port 179 according to transmission electric signals input to the first to n-th electric input ports 175-1 to 175-n.

The first to $2^n$-th single wavelength signals S101-1 to S101-2$^n$ generated by the first to $2^n$-th light sources 15-1 to 15-2$^n$ are input to the optical switch unit 170 through the first to $2^n$-th optical input ports 171-1 to 171-2$^n$.

To the first to n-th electric input ports 175-1 to 175-n, first to n-th transmission electric signals (indicated by arrows S113-1 to S113-n in FIG. 10) having information "0" or "1" are input as switching signals. The first to the n-th transmission electric signals S113-1 to S113-n are electric signals of an NRZ format in which a data cycle is $T_{nbits}$. The first to n-th transmission electronic signals S113-1 to S113-n are set in states of L level and H level depending on n-bit digital information to be transmitted.

The first transmission electric signal S113-1 expresses information of a first bit. When the first transmission electric signal S113-1 is at L level, the first bit is "0". On the other hand, when the first transmission electric signal S113-1 is at H level, the first bit is "1". The second transmission electric signal S113-2 expresses information of a second bit. When the second transmission electric signal S113-2 is at L level, the second bit is "0". On the other hand, when the second transmission electric signal S113-2 is at H level, the second bit is "1". Similarly, the k-th (k is an integer which is 2 or more and n-1 or less) transmission electric signal S113-k expresses information of a k-th bit. When the k-th transmission electric signal S113-k is at L level, the k-th bit is "0". On the other hand, when the k-th transmission electric signal S113-k is at H level, the k-th bit is "1".

The n-th transmission electric signal S113-n expresses information of an n-th bit. When the nth transmission electric signal S113-n is at L level, the nth bit is "0". On the other hand, when the n-th transmission electric signal S113-n is at H level, the n-th bit is "1".

Figure 11:
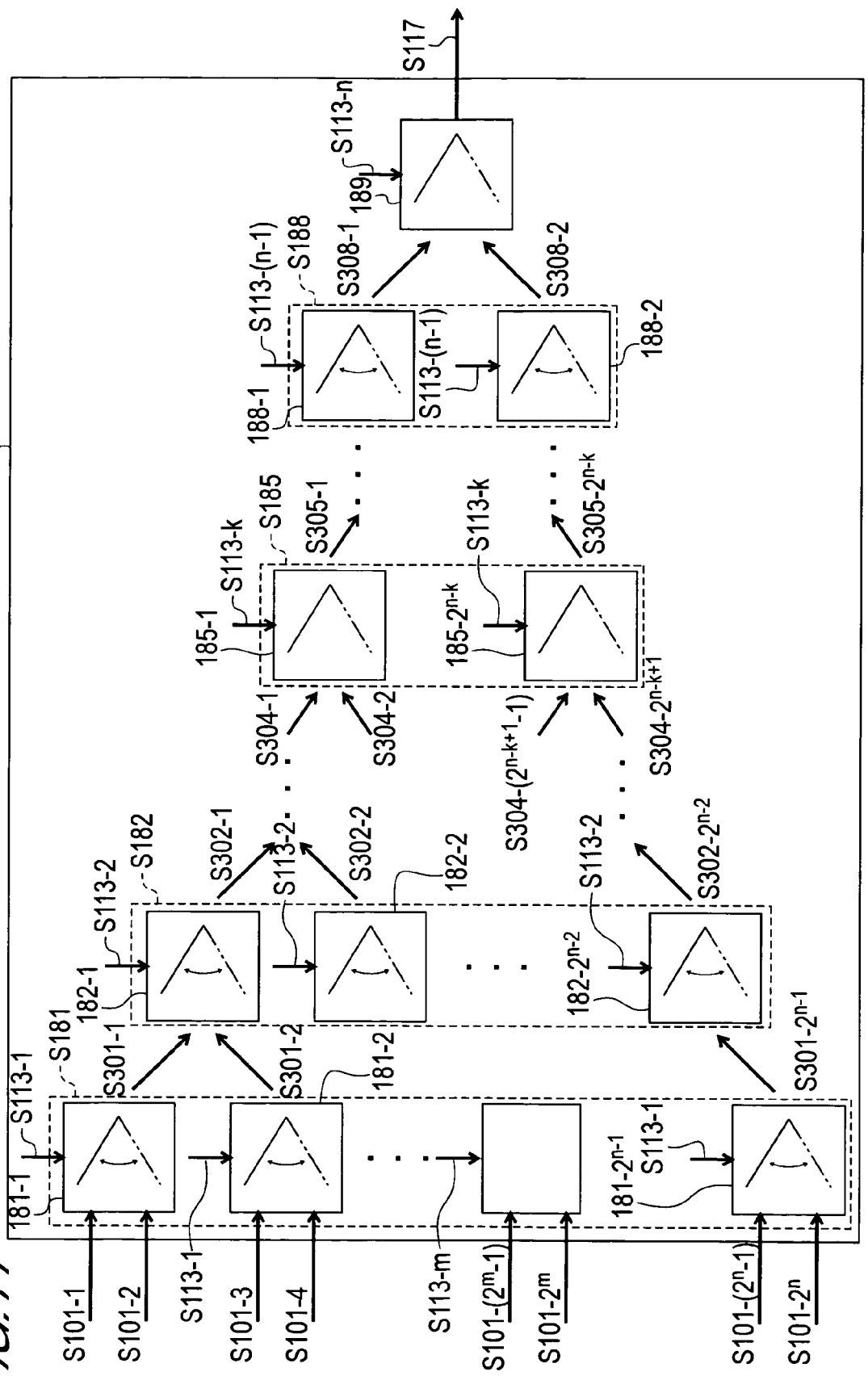
FIG. 11 is a block diagram of a 2n×1 optical switch unit.

An optical switch unit which selects one of $2^n$ inputs to output the selected input will be described below with reference to FIG. 11.

The optical switch unit 170 includes a 1-step switch 181 having first to $2^{n-1}$-th sub-switches 181-1 to 181-2$^{n-1}$, a k-th switch (to be referred to as k-step switch) 185 having first to $2^{n-k}$-th sub-switches (k is an integer which is 2 or more and n-1 or less) 185-1 to 185-2$^{n-k}$, and an n-th switch (to be referred to as an n-step switch) 189.

To the first sub-switch 181-1 included in the 1-step switch 181, a first single wavelength signal S101-1 and a second single wavelength signal S101-2 are input as first and second switch input signals, respectively. To the first sub-switch 181-1 included in the 1-step switch 181, a first transmission electric signal S113-1 is input as a switching signal. When the first transmission electric signal S113-1 is at L level, the first sub-switch 181-1 included in the 1-step switch 181 selects the first single wavelength signal S101-1 as a switch output signal. When the first transmission electric signal S113-1 is at H level, the first sub-switch 181-1 included in the 1-step switch 181 selects the second single wavelength signal S101-2 as a switch output signal. The first sub-switch 181-1 included in the 1-step switch 181 outputs the selected switch output signal as a first sub-switch signal S301-1 serving as a first signal (to be referred to as a 1-step signal). Similarly, to the m-th (m is an integer which is 1 or more and $2^{n-1}$ or less) included in the 1-step switch 181, a (2m-1)-th single wavelength signal S101-(2m-1) and a 2m-th single wavelength signal S101-2m are input as first and second switch input signals, respectively. The first transmission electric signal S113-1 is input to the m-th sub-switch as a switching signal. When the first transmission electric signal S113-1 is at L level, the m-th sub-switch selects the (2m-1)-th single wavelength signal 101-(2m-1) as a switch output signal. On the other hand, when the first transmission electric signal S113-1 is at H level, the m-th sub-switch selects the 2m-th single wavelength signal S101-2m as a switch output signal. The m-th sub-switch outputs the selected switch output signal as an m-th sub-switch signal S301-m.

To a p-th (p is an integer which is 1 or more and $2^{n-k}$ or less) included in the k-step switch 185, a (2p-1)-th sub-switch signal S304-(2p-1) included in a (k-1)-th signal (to be referred to as a (k-1)-step signal) and a 2p-th sub-switch signal S304-2p are input as first and second switch input signals, respectively. To the p-th sub-switch 185-p, the k-th transmission electric signal S113-k is input as a switching signal. When the k-th transmission electric signal S113-k is at L level, the p-th sub-switch 185-p selects the (2p-1)-th sub-switch signal S304-(2p-1) as a switch output signal. On the other hand, when the k-th transmission electric signal S113-k is at H level, the p-th sub-switch 185-p selects the 2p-th sub-switch signal S304-2p as a switch output signal. The p-th sub-switch 185-p outputs the selected switch output signal as a p-th sub-switch signal S305-p included in a k-th signal (to be referred to as a k-step signal).

To the n-step switch 189, a first sub-switch signal S308-1 and a second sub-switch signal S308-2 included in the (n-1)-step signal are input as first and second switch input signals, respectively. To the n-step switch 189, the n-th transmission electric signal S113-n is input as a switching signal. When the nth transmission electric signal S113-n is at L level, the n-step switch 189 selects the first sub-switch signal S308-1 as a switch output signal. On the other hand, the n-th transmission electric signal S113-n is at H level, the n-step switch 189 selects the second-sub switch signal S308-2 as a switch output signal. The n-step switch 189 outputs the selected switch output signal as an input optical signal S117.

As each of the first to ($2^{n-1}$)-th sub-switches 181-1 to 181-$2^{n-1}$ included in the 1-step switch 181, the first to ($2^{n-k}$)-th sub-switch 185-1 to 185-$2^{n-k}$ included in the k-step switch 185, and the n-step switch 189, any one of an optical switch using the EAM described with reference to FIG. 3 and an optical switch using the Mach-Zehender interferometer described with reference to FIG. 4 can be used. Here, detailed descriptions of the first to $2^{n-1}$ sub-switches included in the 1-step switch 181, the first to $2^{n-k}$ sub-switches included in the k-step switch, and the n-step switch are omitted.

The delaying unit 161 includes one input port and one output port. The delaying unit 161 delays optical pulses having wavelengths $\lambda 1$ to $\lambda 2^n$ of carrier waves by different delay times with respect to an optical pulse signal S127 input from the input port. As a result, the delayer obtains a pulse position modulating signal (indicated by an arrow S133 in FIG. 10) obtained by performing pulse position modulation to the optical pulse signal S127 and outputs the pulse position modulating signal S133 from the output port.

Figure 12:
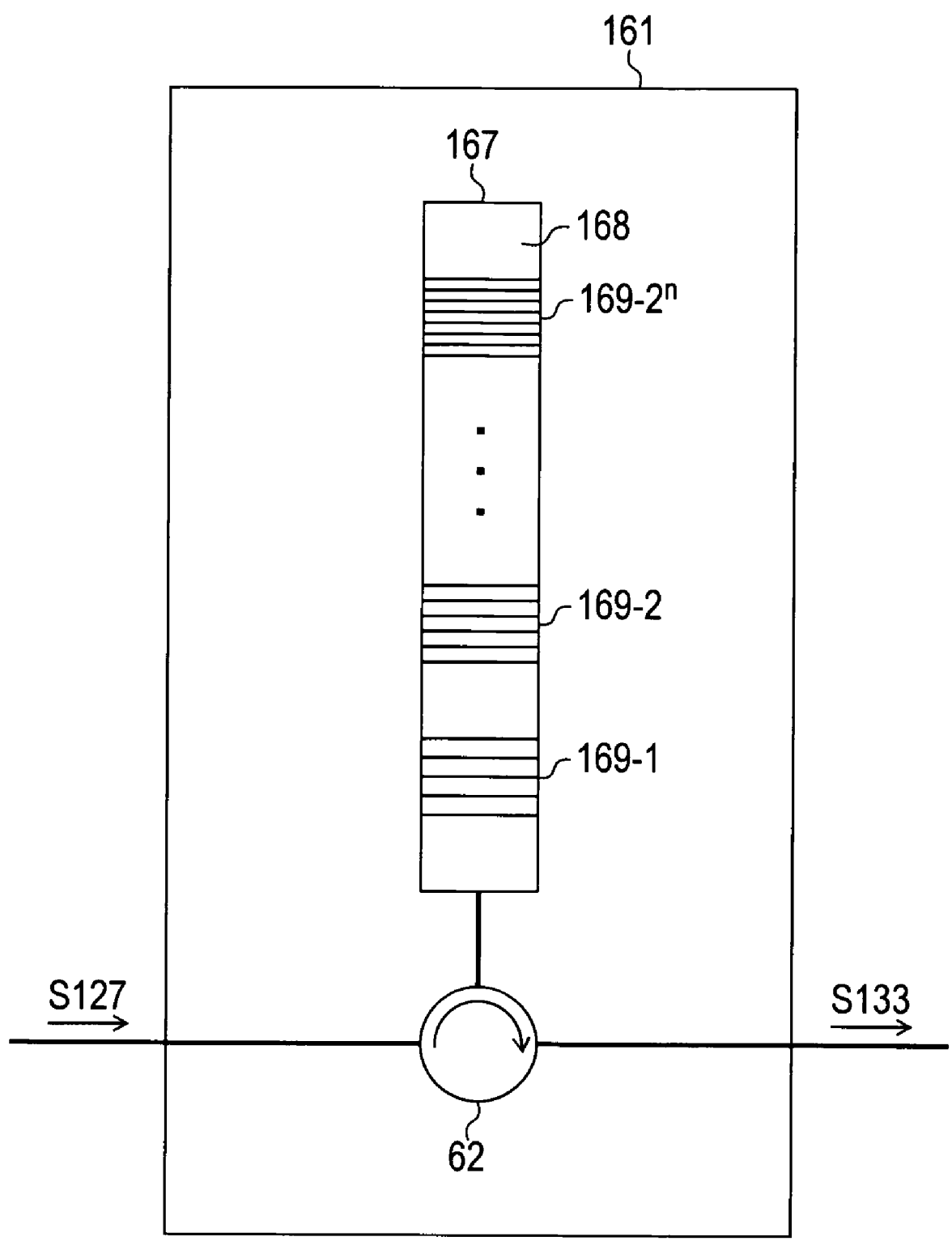
FIG. 12 is a schematic diagram of a delaying unit for a multi-valued PPM using an FBG.
Figure 13:
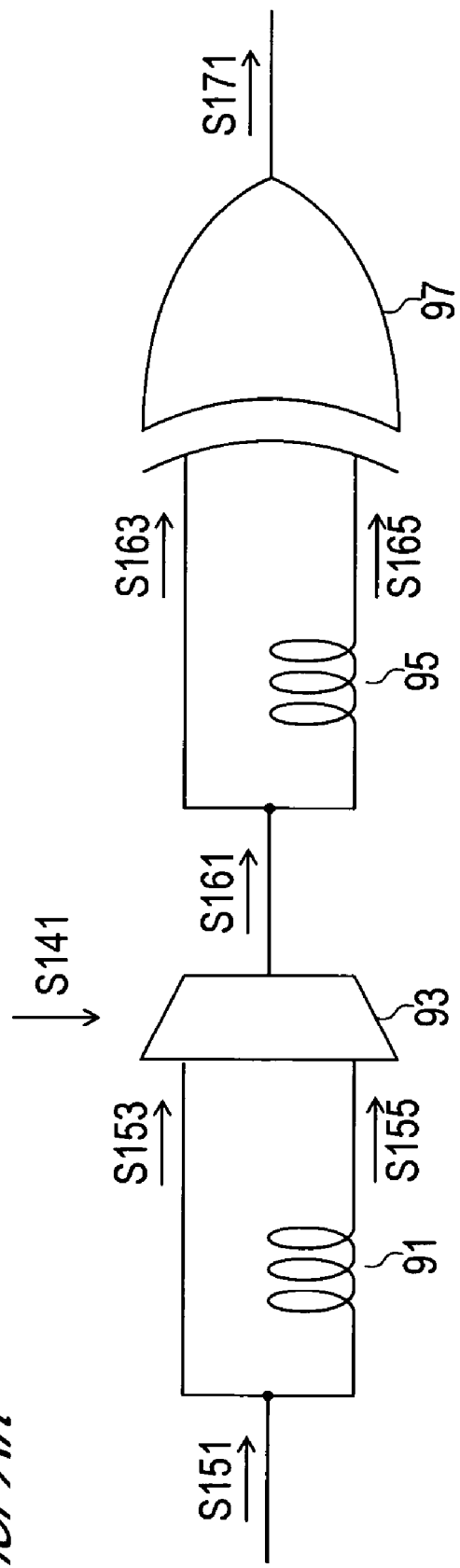
FIG. 13 is a block diagram showing a conventional modulating circuit.

A delaying unit using an FBG will be described below as a preferred embodiment of the delaying unit with reference to FIG. 12.

The delaying unit 161 includes an optical circulator 62 and an FBG delayer 167. The optical circulator 62 transmits the optical pulse signal S127 input from the input port to the FBG delayer 167 and outputs the pulse position modulating signal S133 obtained by the FBG delayer 167 from the output port as will be described later.

The FBG delayer 167 is constructed such that a plurality of diffraction gratings having different cycles $\Lambda$ is arranged in an optical fiber 168. With this configuration, different amounts of delay can be given to optical pulses having different wavelengths of carrier waves. In the FBG delayer 167 of this configuration, first to $2^n$-th unit FBGs 169-1 to 169-$2^n$ are sequentially arranged in the optical fiber 168 in a propagating direction of light. In this case, a q-th (q is an integer which is 1 or more and $2^n$ or less) unit FBG 169-q is formed such that a cycle $\Lambda q$ of the diffraction grating satisfies $\lambda q = 2 \times n \times \Lambda q$. The first unit FBG 169-1 is arranged at a position near an input terminal of the optical pulse signal S127 from the optical circulator 62, and the 2nth unit FBG 169-$2^n$ is arranged at a position far from the input terminal.

The q-th unit FBG 169-$q$ reflects light having a q-th wavelength $\lambda q$. Due to a difference between positions of the first unit FBG 169-1 and the second to $2^n$-th unit FBGs 169-2 to 169-$2^n$ in a propagating direction in the optical fiber 168, time differences t2 to t$2^n$ are generated in the optical pulses reflected by the first unit FBG 169-1 and the second to $2^n$-th unit FBGs 169-2 to 169-$2^n$. As a result, when references are determined at intervals equal to a clock cycle on the basis of a position of an optical pulse having a first wavelength $\lambda 1$ as a wavelength of a carrier wave on a time axis, optical pulses having second to $2^n$-th wavelength $\lambda 2$ to $\lambda 2^n$ of carrier waves are delayed by t2 to t$2^n$ from the references. In this manner, a pulse position modulation (PPM) signal can be obtained from the pulse signal.

According to the optical modulating circuit and the optical modulating method of the third embodiment, the same effect as that of the optical modulating circuit and the optical modulating method of the first embodiment can be obtained, and PPM can be realized with respect to information of 3 bits or more by using an electric circuit having a frequency band equal to a data rate.

What is claimed is:

1. An optical modulating circuit comprising:
   a first light source which generates as a first single wavelength signal continuous light having a wavelength of a carrier wave as a first wavelength;
   a second light source which generates as a second single wavelength signal continuous light having a wavelength of a carrier wave as a second wavelength different from said first wavelength;
   an optical switch to which is input a transmission electric signal having information "0" or "1" as a switching signal, said first single wavelength signal as a first switch input signal and said second single wavelength signal as a second switch input signal and which selects said first single wavelength signal as a switch output signal when said information is "0", selects said second single wavelength signal as a switch output signal when said information is "1", and outputs the selected switch output signal as an input optical signal;
   an optical modulator which generates, from said input optical signal, an optical pulse signal obtained by arranging optical pulses having any one of said first wavelength and said second wavelength as a wavelength of a carrier wave at constant time intervals; and
   a delaying unit which delays the optical pulse having said first wavelength as the wavelength of the carrier wave and an optical pulse having said second wavelength as the wavelength of the carrier wave by different delay times to obtain a pulse position modulating signal.

2. The optical modulating circuit according to claim 1, wherein
   the delaying unit includes:
   a fiber bragg grating delayer constructed such that a first unit fiber bragg grating which reflects the optical pulse having said first wavelength as the wavelength of the carrier wave and a second unit fiber bragg grating which reflects the optical pulse having said second wavelength of the carrier wave are sequentially arranged in an optical fiber in a propagating direction of light in the optical fiber; and
   an optical circulator which transmits the optical pulse signal to the fiber bragg grating delayer and outputs the pulse position modulating signal obtained by the fiber bragg grating delayer.

3. The optical modulating circuit according to claim 1, wherein
   said optical switch includes a first Electro-absorption modulator to which said first switch input signal is input, a second Electro-absorption modulator to which said second switch input signal is input, an optical coupler, and an inverting circuit,
   a first switching signal which is one of signals obtained by dividing said switching signal is input to said first Electro-absorption modulator, said first Electro-absorption modulator outputs said first switch input signal when the information held by said switching signal is "0", and said first Electro-absorption modulator does not output said first switch input signal when the information held by said switching signal is "1",
   a second switching signal which is the other of the signals obtained by dividing said switching signal is inverted by the inverting circuit and then input to said second Electro-absorption modulator, said second Electro-absorption modulator does not output the second switch input signal when the information held by the switching signal is "0", and said second Electro-absorption modulator outputs the second switch input signal when the information held by the switching signal is "1", and the optical coupler couples outputs from the first Electro-absorption modulator and the second Electro-absorption modulator to output a resultant signal as the switch output signal.

4. The optical modulating circuit according to claim 1, wherein the optical switch includes a first optical coupler, a second optical coupler, and an optical phase modulator, said first optical coupler divides each of said first switch input signal and said second switch input signal to be input into a first branch signal and a second branch signal, transmits said first branch signal to said second optical coupler through said optical phase modulator, and transmits said second branch signal to said second optical coupler, said second optical coupler couples said first branch signal and said second branch signal to output a resultant signal as a switch output signal, and said optical phase modulator modulates a phase of said first branch signal according to said switching signal.

5. The optical modulating circuit according to claim 4, wherein said optical phase modulator is an Lithium Niobate (LN) optical modulator.

6. The optical modulating circuit according to claim 4, wherein said first light source and the second light source are distributed feedback semiconductor lasers.

7. An optical modulating circuit comprising:

a first to $2^n$-th light sources which generate first to $2^n$-th single wavelength signals serving as continuous lights having first to $2^n$-th (n is an integer which is 2 or more) wavelengths different from each other as wavelengths of carrier waves, respectively, an optical switch unit which selects any one of the first to $2^n$-th single wavelength signals in correspondence to pieces of n-bit information expressed by first to nth transmission electric signals having the information "0" or "1" input from the outside as a switching signal, and outputs the selected single wavelength signal as an input optical signal, and an optical phase modulator which generates an optical pulse signal obtained by arranging optical pulses having the first to $2^n$-th wavelengths as wavelengths of carrier waves at constant time intervals, a delaying unit which delays the optical pulses having the first to $2^n$-th wavelengths as the wavelengths of the carrier waves by different delay times, respectively, with respect to the optical pulse signal to obtain a pulse position modulating signal.

8. The optical modulating circuit according to claim 7, wherein said delaying unit includes:

a fiber bragg grating delayer constructed such that first to $2^n$-th unit fiber bragg gratings which reflect the optical pulses having the first to $2^n$-th wavelengths as wavelengths of carrier waves are sequentially arranged in the optical fiber in a propagating direction of light in the optical fiber; and an optical circulator which transmits the optical pulse signal to the fiber bragg grating delayer and outputs the pulse position modulating signal obtained by the fiber bragg grating delayer.

9. The optical modulating circuit according to claim 7, wherein when n is set as 2, the optical switch unit includes a 1-step switch having first and second sub-switches and a 2-step switch, the first and second single wavelength signals are input to said first sub-switch as first and second switch input signals, a first transmission electric signal is input to said first sub-switch as a switching signal, said first sub-switch selects the first single wavelength signal as a switch output signal when the information held by said first transmission electric signal is "0", the first sub-switch selects the second single wavelength signal as a switch output signal when information held by the first transmission electric signal is "1", and the first sub-switch outputs the selected switch output signal to the 2-step switch as a first sub-switch signal, the third and fourth single wavelength signals are input to said second sub-switch as the first and second switch input signals, said first transmission electric signal is input to said second sub-switch as a switching signal, the second sub-switch selects the third single wavelength signal as a switch output signal when the information held by the first transmission electric signal is "0", the second sub-switch selects the fourth single wavelength signal as a switch output signal when the information held by the first transmission electric signal is "1", and the second sub-switch outputs the selected switch output signal to the 2-step switch as a second sub-switch signal, and said first and second sub-switch signals are input to the 2-step switch as the first and second switch input signals, the second transmission electric signal is input to the 2-step switch as a switching signal, the 2-step switch selects the first sub-switch signal as a switch output signal when information held by the second transmission electric signal is "0", the 2-step switch selects the second sub-switch signal as a switch output signal when the information held by the second transmission electric signal is "1", and the 2-step switch outputs the selected switch output signal as the input optical signal.

10. The optical modulating circuit according to claim 9, wherein each of the first and second sub-switches and the 2-step switch includes a first Electro-absorption modulator to which the first switch input signal is input, a second Electro-absorption modulator to which the second switch input signal is input, an optical coupler, and an inverting circuit, a first switching signal which is one of signals obtained by dividing said switching signal is input to said first Electro-absorption modulator, said first Electro-absorption modulator outputs the first switch input signal when the information held by said switching signal is "0", and said first Electro-absorption modulator does not output said first switch input signal when the information held by the switching signal is "1", a second switching signal which is the other of the signals obtained by dividing said switching signal is inverted by the inverting circuit and then input to said second Electro-absorption modulator, said second Electro-absorption modulator does not output said second switch input signal when the information held by said switching signal is "0", and said second Electro-absorption modulator outputs said second switch input signal when the information held by said switching signal is "1", and said optical coupler couples outputs from said first Electro-absorption modulator and said second Electro-absorption modulator to output a resultant signal as the switch output signal.

11. The optical modulating circuit according to claim 9, wherein each of the first and second sub-switches and the 2-step switch includes a first optical coupler, a second optical coupler, and an optical phase modulator, said first optical coupler divides each of the first switch input signal and the second switch input signal to be input into a first branch signal and a second branch signal, transmits said first branch signal to the second optical coupler through the optical phase modulator, and transmits said second branch signal to said second optical coupler, said second optical coupler couples the first branch signal and the second branch signal to output a resultant signal as a switch output signal, said optical phase modulator changes phases of the first branch signal according to the switching signal.

12. The optical modulating circuit according to claim 11, wherein said optical phase modulator is an Lithium Niobate (LN) optical modulator.

13. The optical modulating circuit according to claim 11, wherein the first to $2^n$-th light sources are distributed feedback semiconductor lasers.

14. The optical modulating circuit according to claim 7, wherein when n is 3 or more, said optical switch unit includes a 1-step switch which has first to $(2^{n-1})$-th sub-switches and outputs a 1-step signal, a k-step switch which has first to $(2^{n-k})$-th (k is an integer which is 2 or more and n-1 or less) sub-switches outputs a k-step signal, and an n-step switch, to an m-th (m is an integer which is 1 or more and $2^{n-1}$ or less) included in the 1-step switch, a (2m=1)-th and a 2m-th single wavelength signals are input as first and second switch input signals, respectively, and the first transmission electric signal is input as a switching signal, an m-th sub-switch selects the (2m−1)-th single wavelength signal as a switch output signal when the information held by the first transmission electric signal is "0", the m-th sub-switch selects the 2m-th single wavelength signal as a switch output signal when the information held by the first transmission electric signal is "1", and the m-th sub-switch outputs the selected switch output signal as an m-th sub-switch signal included in the 1-step signal, to a p-th (p is an integer which is 1 or more and $2^{n-k}$ or less) included in the k-step switch, (2p−1)-th and 2p-th sub-switch signals included in a (k−1)-step signal are input as first and second switch input signals, respectively, and a k-th transmission electric signal is input as a switching signal, the p-th sub-switch selects a (2p−1)-th sub-switch signal as a switch output signal when the information held by the k-th transmission electric signal is "0", the p-th sub-switch selects the 2p-th sub-switch signal as a switch output signal when the information held by the k-th transmission electric signal is "1", and the p-th sub-switch outputs the selected switch output signal as a p-th sub-switch signal included in a k-step signal, to the n-step switch, first and second sub-switch signals included in an (n−1)-step signal are input as first and second switch input signals, and an n-th transmission electric signal is input as a switching signal, an n-step sub-switch selects the first sub-switch signal included in the (n−1)-step signal as a switch output signal when information held by the nth transmission electric signal is "0", the n-step switch selects the second sub-switch signal as included in the (n−1)-step signal a switch output signal when the information held by the nth transmission electric signal is "1", and the n-step switch outputs the selected switch output signal as an input optical signal.

15. The optical modulating circuit according to claim 14, wherein each of the first to $2^{n-1}$-th sub-switches included in the 1-step switch, the first to $2^{n-k}$-th sub-switches included in the k-step switch, and the n-step switch includes a first Electro-absorption modulator to which the first switch input signal is input, a second Electro-absorption modulator to which the second switch input signal is input, an optical coupler, and an inverting circuit, to said first Electro-absorption modulator, a first switching signal which is one of signals obtained by dividing said switching signals is input, said first Electro-absorption modulator outputs a first switch input signal when information held by said switching signal is "0", said first Electro-absorption modulator does not output said first switch input signal when the information held by said switching signal is "1", to said second Electro-absorption modulator, a second switching signal which is the other of the signals obtained by dividing said switching signal is inverted by the inverting circuit and then input, said second Electro-absorption modulator does not outputs the second switch input signal when the information held by said switching signal is "0", said second Electro-absorption modulator outputs said second switch input signal when the information held by said switching signal is "1", and said optical coupler couples outputs from said first Electro-absorption modulator and said second Electro-absorption modulator to output a resultant signal as the switch output signal.

16. The optical modulating circuit according to claim 14, wherein each of the first to $2^{n-1}$-th sub-switches included in the 1-step switch, the first to $2^{n-k}$-th sub-switches included in the k-step switch, and the n-step switch includes a first optical coupler, a second optical coupler, and an optical phase modulator, said first optical coupler divides each of the first switch input signal and the second switch input signal to be input into a first branch signal and a second branch signal, transmits the first branch signal to the second optical coupler through the optical phase modulator, and transmits the second branch signal to the second optical coupler, said second optical coupler couples said first branch signal and said second branch signal to output a resultant signal as the switch output signal, and said optical phase modulator changes phases of the first branch signal according to said switching signal.

17. The optical modulating circuit according to claim 16, wherein said optical phase modulator is an Lithium Niobate (LN) optical modulator.

18. The optical modulating circuit according to claim 16, wherein
the first to $2^n$-th light sources are distributed feedback semiconductor lasers.

19. An optical modulating method comprising the steps of:
for a first single wavelength signal serving as a continuous light having a first wavelength as a wavelength of a carrier wave and a second single wavelength signal serving as a continuous light having a second wavelength different from the first wavelength as a wavelength of a carrier wave, according to a transmission electric signal having information "0" or "1", selecting said first single wavelength signal as an input optical signal when the information is "1", and, on the other hand, selecting said second single wavelength signal as an input optical signal when the information is "0";

from the selected input optical signal, generating an optical pulse signal obtained by arranging optical pulses having the first wavelength or the second wavelength as a wavelength of a carrier wave at predetermined time intervals; and delaying an optical pulse having the first wavelength as the wavelength of the carrier wave and an optical pulse having the second wavelength as the wavelength of the carrier wave by different delay times to obtain a pulse position modulating signal.

20. An optical modulating method comprising the steps of:
for first to $2^n$-th (n is an integer which is 2 or more) single wavelength signals serving as continuous lights having first to $2^n$-th wavelengths of carrier waves different from each other, selecting any one of first to $2^n$-th single wavelength signals as input optical signals in one-to-one correspondence to pieces of n-bit information expressed by first to nth transmission electric signals having "0" or "1";

from the selected input optical signals, generating an optical pulse signal obtained by arranging optical pulses each having any one of the first to $2^n$-th wavelengths as a wavelength of a carrier wave at predetermined time intervals; and delaying the optical pulses having the first to $2^n$th wavelengths as the wavelengths of the carrier waves by different delay times to obtain a pulse position modulating signal.

* * * * *